(12) United States Patent
Lundin

(10) Patent No.: US 12,459,976 B2
(45) Date of Patent: Nov. 4, 2025

(54) PEPTIDES AND THEIR USE IN DIAGNOSIS

(71) Applicant: Biotome Pty Ltd., West Perth (AU)

(72) Inventor: Bror Samuel Lundin, Mölndal (SE)

(73) Assignee: Biotome Pty Ltd., West Perth (AU)

( * ) Notice: Subject to any disclaimer, the term of this patent is extended or adjusted under 35 U.S.C. 154(b) by 0 days.

(21) Appl. No.: 18/680,407

(22) Filed: May 31, 2024

(65) Prior Publication Data

US 2024/0309054 A1   Sep. 19, 2024

Related U.S. Application Data

(63) Continuation of application No. 17/852,797, filed on Jun. 29, 2022, now Pat. No. 12,037,365, which is a continuation of application No. 16/488,077, filed as application No. PCT/EP2018/054396 on Feb. 22, 2018, now Pat. No. 11,401,308.

(30) Foreign Application Priority Data

Feb. 24, 2017   (SE) .................................... 1750203-0

(51) Int. Cl.
| | |
|---|---|
| G01N 33/569 | (2006.01) |
| C07K 14/205 | (2006.01) |
| G01N 33/574 | (2006.01) |

(52) U.S. Cl.
CPC ..... *C07K 14/205* (2013.01); *G01N 33/56922* (2013.01); *G01N 33/57446* (2013.01); *G01N 2333/205* (2013.01); *G01N 2469/20* (2013.01)

(58) Field of Classification Search
None
See application file for complete search history.

(56) References Cited

U.S. PATENT DOCUMENTS

| | | |
|---|---|---|
| 6,019,974 A | 2/2000 | L'Hernault |
| 6,902,903 B1 | 6/2005 | Quan et al. |
| 7,141,244 B1 | 11/2006 | Covacci et al. |
| 9,700,514 B1 * | 7/2017 | Rubin ................ A61K 31/7048 |
| 2005/0014138 A1 | 1/2005 | Rath |
| 2005/0260581 A1 | 11/2005 | Fontana et al. |
| 2015/0153356 A1 | 6/2015 | Meng et al. |
| 2016/0030510 A1 | 2/2016 | Lu et al. |

FOREIGN PATENT DOCUMENTS

| | | |
|---|---|---|
| CN | 1313337 A | 9/2001 |
| CN | 104147589 A | 11/2014 |
| JP | 2000350591 A | 12/2000 |
| JP | 2004123737 A | 4/2004 |
| JP | 200655168 A | 3/2006 |
| WO | 2001/042277 A2 | 6/2001 |
| WO | 2016/172722 A1 | 10/2016 |

OTHER PUBLICATIONS

Asahi, M. et al., Helicobacter pylori CagA Protein Can Be Tyrosine Phosphorylated in Gastric Epithelial Cells, J Exp Med, 191(4): 593-602, 2000.
Higashi, H. et al., EPIYA Motif is a Membrane-Targeting Signal of Helicobacter pylori Virulence Factor CagA in Mammalian Cells, Journal of Biological Chemistry, 280(24): 23130-23137, Jun. 17, 2005.
Notice of Reasons for Refusal for Japanese Patent Application No. 2022-200083, Jun. 6, 2024.
Database Uniprot Accession No. Q9RF15 2000.
Yasuda, A. et al., A novel diagnostic monoclonal anibody specific for Helicobacter pylori CagA of East Asian type, APMIS, 117(12): 893-899, Nov. 17, 2009.
Gholi, M. et al., Helicobacter pylori FliD protein is a highly sensitive and specific marker for serologic diagnosis of H. pyrlori infection, International Journal of Medical Microbiology, 303(8): 618-623, Dec. 8, 2013.
English translation of Notice of Reasons for Refusal for Japanese Patent Application No. 2019-567783, Nov. 16, 2021.

\* cited by examiner

*Primary Examiner* — Oluwatosin A Ogunbiyi
(74) *Attorney, Agent, or Firm* — Julie K. Staple; Fishman Stewart PLLC

(57) ABSTRACT

There is provided novel peptides for use in diagnosis of CagA+ *H. pylori* infection or the prediction of risk for gastric cancer. The peptides bind antibodies from CagA+ *H pylori* patients with high specificity and sensitivity, and can be used for example in a diagnostic kit.

8 Claims, 4 Drawing Sheets
Specification includes a Sequence Listing.

PEPTIDES AND THEIR USE IN DIAGNOSIS

REFERENCE TO RELATED APPLICATIONS

This application is a continuation of U.S. patent application Ser. No. 17/852,797, filed Jun. 29, 2022, which is a continuation of U.S. patent application Ser. No. 16/488,077, filed Aug. 22, 2019, now U.S. Pat. No. 11,401,308, which is a U.S. national stage application of PCT/EP2018/054396, filed Feb. 22, 2018, which claims priority to Swedish application No. 1750203-0, filed Feb. 24, 2017, the entire content of each of which is incorporated herein by reference.

FIELD OF THE INVENTION

This invention relates to novel peptides from the CagA protein of *Helicobacter pylori*. The peptides can be used for improved prevention, diagnosis and treatment of bacterial infection and assessment of gastric cancer risk.

SEQUENCE LISTING

The instant application contains a Sequence Listing which has been submitted electronically as a file in XML format and is hereby incorporated by reference in its entirety. Said XML format file, created on May 31, 2024, is named 47BIOT-NO10104NA.xml and is 295,338 bytes in size.

BACKGROUND OF THE INVENTION

*Helicobacter pylori* is a bacterium usually found in the stomach. Some *H. pylori* strains carry the CagA (cytotoxicity-associated antigen A) gene which encodes for a virulence factor. The CagA gene encodes the 1140 to 1180-amino acid protein CagA which is a bacterial oncoprotein that is translocated into stomach epithelial cells at the site of infection. Upon translocation, it affects intracellular signalling pathways of the epithelial cell.

*H. pylori* bacteria carrying the CagA gene are associated with increased risk for gastric cancer development, and presence of anti-CagA-antibodies is associated with increased future gastric cancer risk. Early detection of CagA+ *H. pylori* infection can lead to increased cancer survival, as eradication of infection in infected individuals reduces gastric cancer risk. Therefore, a method that identifies individuals carrying CagA+ *H. pylori* can be used to diagnose high gastric cancer risk, and thereby assist prevention of gastric cancer development.

However, existing serology methods for CagA+ *H. pylori* infections are not clinically useful, mainly because they are not specific enough. There are high levels of false-positive samples indicating widespread antibody reactivity to CagA even in individuals not infected with *H. pylori*, or in individuals infected with a *H. pylori* strain lacking CagA. Thus, specificity and sensitivity has not been sufficient for a clinically useful diagnostic test (Yamaoka et al, J Clin Microbiol 1998:36:3433; Yamaoka et al, Gastroenterology 1999:117:745; Figueiredo et al, J Clin Microbiol 2001:39: 1339).

Therefore, there is a need for a diagnostic test for CagA+ *H. pylori* with improved diagnostic properties, for example improved specificity and sensitivity.

Furthermore, there is a great variability in the DNA-sequences among different *H. pylori* isolates. Certain CagA-variants are more strongly associated to gastric cancer risk. Therefore, it would also be useful to be able to identify the CagA strain type.

There is also a need for CagA-peptides that bind specifically to antibodies, in particular antibodies that bind to the CagA protein.

SUMMARY OF THE INVENTION

Herein it is provided information about peptides from CagA that are useful for diagnostic applications related to *H. pylori*-associated disease, including identification of individuals at high risk of gastric cancer development. *H. pylori*-infected individuals will raise antibodies against *H. pylori* proteins, including CagA. Thus, the presence of CagA-specific antibodies indicates *H. pylori* infection.

From all CagA peptides present in infected individuals, we have 1) defined which subset that is immunogenic and elicits an antibody-response (see Table 1, where 34% of the length of the protein is immunogenic). It turned out that many peptides react also with serum from non-infected patients (white bars in FIG. 1). Within the subset of immunogenic peptides, we have identified 2) the smaller subset of peptides that has a diagnostic capacity; and finally, in this subset of diagnostic peptides, we have 3) identified the crucial amino acid sequence(s) common to the peptides having the highest diagnostics capacity. In other words, the diagnostic capacity does not stem from only the presence/absence of peptides in the infected individual, but crucially also from only a small subset of the immunogenic peptides consistently eliciting an antibody-response that is absent in non-infected individuals.

By utilizing high-precision serology, with resolution at the peptide level instead of at protein level, we identified peptides to which there is a strong antibody-response only in individuals carrying CagA+ *H. pylori*, while excluding peptides that cause false positives due to a cross-reactive antibody-response in individuals lacking a CagA+ *H. pylori* infection. Therefore, the diagnostic peptides we have identified have both high sensitivity and specificity as determined by ROC AUC values, and will be useful for diagnostic applications.

In a first aspect of the invention there is provided a peptide comprising or consisting of an amino acid sequence selected from the group consisting of SEQ ID NO 1 to SEQ ID NO 7. Preferably said peptide consists of at most 25 amino acids, more preferably 15 amino acids and even more preferred at most 10 amino acids. In a preferred embodiment the peptide comprises or consists of the sequence selected from the group consisting of SEQ ID NO 2-7, or even more preferred the group consisting of SEQ ID NO 2-5.

These novel peptides have the advantage that they can be used for diagnosis, more specifically diagnosis of CagA-positive *H. pylori*. Thus, diagnosis using these peptides results in few false positives.

The minimal binding regions that have been identified are also useful for detecting CagA-specific antibodies. Since they are short, there will be low background binding. Furthermore, the peptides are short and can therefore be manufactured at a low cost.

In a second aspect of the invention there is provided a peptide according to the first aspect of the invention for use in diagnosis. In a preferred embodiment the diagnosis is diagnosis of *H. pylori* infection, more specifically CagA-positive *H. pylori*, or for prediction of the risk for gastric cancer.

In a third aspect of the invention there is provided a kit comprising a peptide according to the first aspect of the invention or a mixture of peptides according to the second aspect of the invention. The kit is preferably a kit for diagnosis, more specifically diagnosis of CagA-positive *H. pylori*, or for prediction of the risk for gastric cancer.

In a fourth aspect of the invention there is provided a method of diagnosis comprising the steps of a) isolating or providing a sample from a subject, b) contacting said sample with a peptide as described herein or a mixture of peptides as described herein, and c) detecting specific binding of antibodies in the sample to the peptide. The method is, in a preferred embodiment, used for detection of *H. pylori* infection or for the prediction of risk for gastric cancer.

In a fifth aspect of the invention there is provided a method for preventing gastric cancer in a subject comprising the steps of 1) carrying out diagnosis as described herein and 2) treating the *H. pylori* CagA+ infection in the subject. The method may comprise the steps of using the diagnosis method herein to determine that the subject has a *Helicobacter pylori* infection, and then treating the infection. The treatment may involve administering an antibiotic selected from a class of antibiotics the class of antibiotics selected from the group consisting of macrolides, beta-lactams, nitro-imidazoles, tetracyclines and fluoroquinolones. The treatment may involve administering two antibiotics from said classes, where the two antibiotics are from different classes. The treatment may also involve administering a proton pump inhibitor to the subject, preferably in combination with antibiotics.

In a sixth aspect of the invention there is provided a method of detecting *H. pylori* CagA-binding antibodies in a sample from a subject, the method comprising contacting a biological sample with a peptide according to the first aspect of the invention and detecting binding of antibodies in the sample to the peptide. The sample may be a blood, serum, plasma sample or tissue sample, for example a gastric tissue sample.

In a seventh aspect of the invention there is provided a mixture of at least two peptides according to the first aspect of the invention. Such a mixture has the advantage that it can be used for detecting two or more different CagA-positive strains of *H. pylori* in an efficient manner. The mixtures can be in used the same manner as the peptides herein.

BRIEF DESCRIPTION OF DRAWINGS

FIG. 2A shows results as box plot, including median, interquartile range and outliers;

FIG. 2B shows results for each individual peptide are shown, grouped by epitope.

Figure 1:
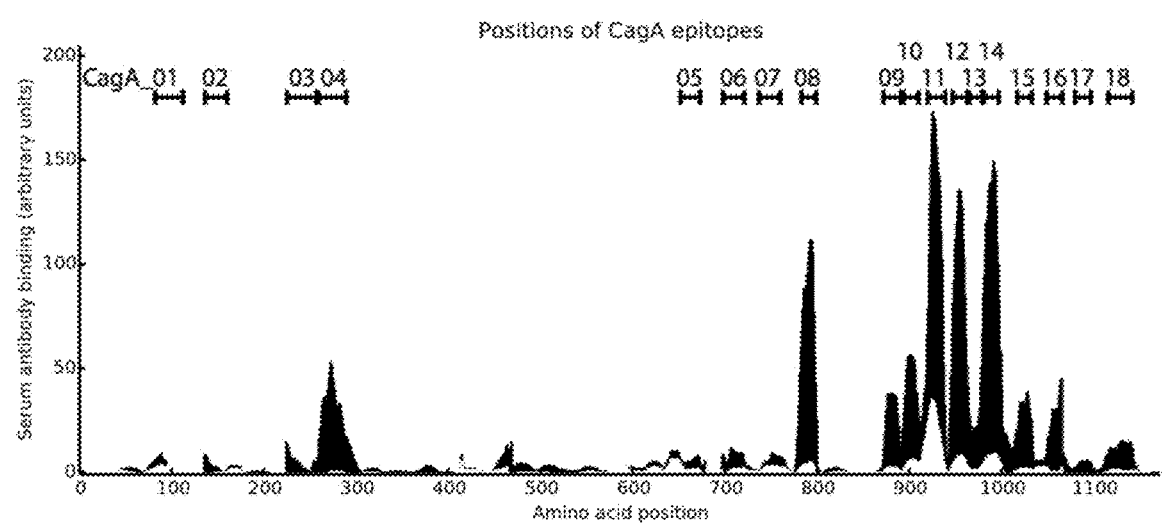
FIG. 1 shows an identification of 18 different linear B-cell epitopes of CagA using peptide microarray analysis. The array score for each peptide (n=1172 peptides) is shown as a vertical bar at the start position in the CagA sequence (x-axis). Black bars are results of sera from *H. pylori*-infected individuals, and white bars are results of sera from *H. pylori* uninfected individuals. Importantly, many peptides shown reactivity also with serum from non-infected individuals (white bars)

BT_300: IINQKVTDKVDNLNQ (SEQ ID NO 13)(at least 12 out of 15 amino acids identical, n=298 peptides);
BT_301: EPIYA (SEQ ID NO 8) (n=270);
BT_302: EPIYAK (SEQ ID NO 9) (n=16);
BT_303: EPIYAQ (SEQ ID NO 10) (n=21);
BT_304: EPIYT (SEQ ID NO 11) (n=21);
BT_305: EPIYAT (SEQ ID NO 12) (n=196);
BT_306: FXLKRHX (SEQ ID NO 1) (n=246);
BT_307: FXLKKHX (SEQ ID NO 2) (n=34);
BT_308: FXLKQHX (SEQ ID NO 3) (n=1);
BT_309: YXLKRHX (SEQ ID NO 4) (n=3);
BT_310: IXLKRHX (SEQ ID NO 5) (n=1);
BT_311: FXLRRYX (SEQ ID NO 6) (n=1);
BT_312: FXLRRSX (SEQ ID NO 7) (n=7).
AUC=0.5 is indicated as a dashed horizontal line.

DETAILED DESCRIPTION OF THE INVENTION

Sometimes it is referred to an interval of sequences herein. This refers to all the sequences in the interval, thus for example "SEQ ID NO 2 to SEQ ID 5" refers to SEQ ID NO, 2, 3, 4, and 5. Sequences are written using the standard one-letter annotation for amino acid residues. The amino acid residues are preferably connected with peptide bonds.

Some peptides herein may have sequence variability. Thus, certain sequences may specify a position in the sequence that can be any amino acid. This may be indicated with an X or, in the sequence listing, Xaa. The X or Xaa can be replaced with any amino acid, preferably any L-amino acid, including amino acids resulting from post translational modification, such as citrulline. The amino acid does not have to be a naturally occurring amino acid. Preferably the amino acid does not have a bulky side chain, as a bulky side chain could prevent antibody binding. A suitable molecular weight of the amino acid may be from 85 D to 300 D, more preferably from 89 D to 220 D.

In general, the peptide may comprise or consist of an amino acid sequence selected from the group consisting of SEQ ID NO 1 to SEQ ID NO 330 The peptide may comprise of parts of the sequences of SEQ ID NO 32 to SEQ ID NO 330, for example 12, more preferred 13, even more preferred 14 and most preferred all 15 of the residues of SEQ ID NO 32 to SEQ ID NO 330. When the peptide comprises or consists of 12, 13, or 14 of the amino acids of SEQ ID NO 32-330, the other amino acid position may be replaced with any amino acid as described above for X and Xaa, while the remaining amino acids have the positions as in SEQ ID NO 32-330. In certain embodiments the amino acid may be replaced in a conserved manner, wherein, for example, a hydrophobic amino acid is replaced with a different hydrophobic amino acid, or where a polar amino acid is replaced with a different polar amino acid.

In some embodiments a peptide comprising or consisting of an amino acid sequence of SEQ ID NO 32 to SEQ ID NO 330 (table 2 and 3) may be preferred. In one embodiment a peptide comprising or consisting of one of SEQ ID NO 14 to SEQ ID NO 31 is used. In one embodiment a peptide comprising or consisting of one of SEQ ID NO 32 to SEQ ID NO 207 is used (Table 2). In one embodiment a peptide comprising or consisting of one of SEQ ID NO 208-330 is used (Table 3).

In a preferred embodiment a peptide comprising or consisting of one of SEQ ID NO 1 to SEQ ID NO 13 is used, for example SEQ ID NO 1, 2, 3, 4, 5, 6, 7, 8, 9, 10, 11, 12 or 13 (Table 4). These sequences comprise the minimal binding regions of certain antibodies. In a preferred embodiment the peptide comprises or consists of an amino acid sequence selected from SEQ ID NO 1 to SEQ ID NO 12.

In an even more preferred embodiment the peptide comprises or consists of a sequence selected from SEQ ID No 1 to SEQ ID NO 7. These peptides have the advantage that the diagnostic accuracy is higher, since they elicit a strong antibody-response in a high percentage of individuals carrying a CagA+ *H. pylori* infection. These peptides (SEQ ID NO 1 to SEQ ID NO 7) all relate to the same epitopes (epitope 12 and 14), and around 95% of all CagA+ *H. pylori* isolates of the world carry at least one of these sequence variants. Furthermore, the peptides have common structural features in that:

They all have seven amino acid residues.
They all have a hydrophobic residue in the first position (F, Y or I).
They all have x in the second position.
They all have an L in the third positon.
They all have K or R (positive side chains) in the fourth position,
They all have an x in the seventh position.

Examples of useful peptides that comprise SEQ ID NO 1 to SEQ ID NO 7 include, but is not limited to, sequences SEQ ID NO 129 to SEQ ID NO 170, SEQ ID NO 186 to SEQ ID NO 187 and SEQ ID NO 266 to SEQ ID NO 279.

In an even more preferred embodiment the peptide comprises or consists of a sequence selected from SEQ ID NO 1, 2, 3, 4 and 5, or even more preferred, one or more sequences selected from the group consisting of SEQ ID NO 2, 3, 4, 5, 6, and 7 or even more preferred SEQ ID NO 2, 3, 4 and 5. Examples of useful peptides that comprise these sequences are described in Tables 2 and 3.

In one embodiment the peptide comprises or consist of the sequence of SEQ ID NO 13, or a sequence of twelve amino acid residues selected from that sequence, where the other three amino acid residues can be any amino acid, as described above. Useful amino acid sequences that comprise at least twelve amino acids from SEQ ID NO 13 include, but is not limited to, sequences SEQ ID No 52 to SEQ ID NO 67 and SEQ ID NO 235 to SEQ ID NO 256.

In one embodiment the peptide comprises or consists of the sequence of SEQ ID NO 153, or a sequence of 12, 13 or 14 amino acids selected from that sequence, where the other amino acid residues can be any amino acid, as described above.

The peptide preferably has a length of 25 amino acids or shorter, such as 20 or 15 amino acids. A shorter peptide may be desirable because it results in less unspecific binding (by an antibody) and therefore less background. However, a longer peptide may in some cases be desirable to allow for exposing the epitope to allow antibody binding without sterical hindrance, or for peptide folding. Thus, more preferably the peptide is 14 amino acid residues, more preferably 13 amino acid residues, even more preferably 12, 11, 10, 9, 8, 7, 6 or 5 amino acid residues (6 applies to SEQ ID 8, 11, 9, 10 and 12 only, and 5 applies to SEQ ID NO 8 and 11 only).

Preferably the peptide binds specifically (in the immunological sense) and with high affinity to an antibody, preferably an antibody that also binds to the *H. pylori* CagA protein. An antibody-peptide interaction is said to exhibit "specific binding" or "preferential binding" in the immunological sense if it reacts or associates more frequently, more rapidly, with greater duration and/or with greater affinity with a particular cell or substance than it does with alternative cells or substances. An antibody "specifically binds" or "preferentially binds" to a peptide if it binds with greater affinity, avidity, more readily, and/or with greater duration than it binds to other substances. Binding can be determined with any suitable method. Binding can be determined by methods known in the art, for example ELISA, surface plasmon resonance, western blot or the other methods described herein (see below). Such methods can be used for determining suitable length or amino acid sequence of the peptide.

Preferably the use of the peptide has both a high diagnostic specificity and a high diagnostic sensitivity. In any diagnostic test, these two properties are dependent on what level is used as the cut-off for a positive test. To assess diagnostic accuracy independently of a set cut-off, a receiver operator characteristic curve (ROC curve) can be used. In an ROC curve, true positive rate (sensitivity) is plotted against false positive rate (1-specificity) as the cut-off is varied from 0 to infinity. The area under the ROC curve (ROC AUC) is then used to estimate the overall diagnostic accuracy. Preferably the use of the peptide has an ROC AUC of at least 0.55, for example an ROC AUC of at least, 0.60, 0.65, 0.70, 0.75, 0.80, 0.85, 0.90, 0.95, 0.96, 0.97, 0.98, 0.99 or an ROC AUC of 1.00. Preferably, the use of the peptide has ROC AUC of at least 0.85, and most preferably an ROC AUC of 1.

As used herein, the term "peptide" is used to mean peptides, proteins, fragments of proteins and the like, including peptidomimetic compounds. The term "peptidomimetic", means a peptide-like molecule that has the activity of the peptide upon which it is structurally based, the activity being specific and high affinity binding to antibodies that bind to the CagA protein. Such peptidomimetics include chemically modified peptides, peptide-like molecules containing non-naturally occurring amino acids (see, for example, Goodman and Ro, Peptidomimetics for Drug Design, in "Burger's Medicinal Chemistry and Drug Discovery" Vol. 1 (ed. M. E. Wolff; John Wiley & Sons 1995), pages 803-861). A variety of peptidomimetics are known in the art including, for example, peptide-like molecules which contain a constrained amino acid. In certain embodiments circular peptides may be used.

The peptide may be an isolated peptide meaning a peptide in a form other than it occurs in nature, e.g. in a buffer, in a dry form awaiting reconstitution, as part of a kit, etc.

In some embodiments, the peptide is substantially purified meaning a peptide that is substantially free of other proteins, lipids, carbohydrates, nucleic acids and other biological materials with which it is naturally associated. For example, a substantially pure peptide can be at least about 60% of dry weight, preferably at least about 70%, 80%, 90%, 95%, or 99% of dry weight.

A peptide of the present invention can be in the form of a salt. Suitable acids and bases that are capable of forming salts with the peptides are well known to those of skill in the art, and include inorganic and organic acids and bases.

The peptide can be provided in a solution, for example an aqueous solution. Such a solution may comprise suitable buffers, salts, protease inhibitors, or other suitable components as is known in the art.

The peptide may be associated with (e.g. coupled, fused or linked to, directly or indirectly) one or more additional moieties as is known in the art. Non-limiting examples of such moieties include peptide or non-peptide molecules such as biotin, a poly his tag, GST, a FLAG-tag, or a linker or a spacer. The association may be a covalent or non-covalent bond. The association may be, for example, via a terminal cysteine residue or a chemically reactive linking agent, the biotin-avidin system or a poly-his tag. For example, the peptide may be linked with a peptide bond to a single biotin-conjugated lysine residue, in which the lysine is biotinylated via the epsilon amino groups on its side chain, such as the peptide example H-XXXXXXXXXXXXXXX (K(Biotin))-NH2, (SEQ ID NO 331) where X indicates the amino acids of the peptide.

The associated moiety may be used to attach or link the peptide, to improve purification, to enhance expression of the peptide in a host cell, to aid in detection, to stabilize the peptide, etc. In the case of a short peptide attached to a substrate, for example a solid phase, it may be desirable to use a linker or a spacer to ensure exposure of the peptide to antibodies so that the antibodies can bind.

The peptide may be associated with a substrate that immobilizes the peptide. The substrate may be, for example, a solid or semi-solid carrier, a solid phase, support or surface. The peptide may be immobilized on a solid support. Examples includes beads or wells in plates, such as microtiter plates, such as 96-well plates, and also include surfaces of lab-on-a-chip diagnostic or similar devices. The association can be covalent or non-covalent, and can be facilitated by a moiety associated with the peptide that enables covalent or non-covalent binding, such as a moiety that has a high affinity to a component attached to the carrier, solid phase, support or surface. For example, the biotin-avidin system can be used.

The peptides can be used for detecting H. pylori CagA-specific antibodies in a sample from a subject, the method comprising contacting a biological sample with a peptide as described herein and detecting binding of antibodies in the sample to the peptide. The peptide may be associated with a substrate that immobilizes the peptide, as described herein, for example attached to a solid support. The method may include incubation to allow binding, washing, and detection of antibodies as described herein. Methods for detecting binding of antibodies are described below and include for example ELISA.

The peptides can be used for diagnosis, in particular diagnosis of infection of H. pylori or gastric cancer. It is known that CagA H. pylori infection correlates with an increased risk for gastric cancer. Thus, the peptides can be used for assessing the risk of a subject developing gastric cancer. The risk of developing gastric cancer may include the risk of proceeding from not having gastric cancer to having gastric cancer of any stage, of proceeding from a benign disease state to a malign state or proceeding from a less malign state to a more malign state. Thus, the risk may include the risk of having gastric cancer or developing gastric cancer in the future. In a preferred embodiment the peptide is used for assessing the risk of a subject developing gastric cancer in the future. The peptides can also be used for diagnosis of other diseases that are associated with H. pylori infection, such as peptic ulcer disease, dyspepsia and immune thrombocytopenia purpura (ITP).

Diagnosis can be carried out using any suitable method. In a preferred method, antibodies in a sample from a subject are allowed to bind to a peptide, and binding is detected. The subject can be a human or an animal, preferably a human. Binding in vitro of antibodies from the subject to the peptide indicates that the immune system of the subject has generated antibodies against that particular peptide and thus that that peptide and hence that CagA H. pylori is present in the subject.

The method may comprise the steps of (1) isolating, from a subject, a sample of body fluid or tissue likely to contain antibodies or providing, in vitro, such a sample; (2) contacting the sample with a peptide, under conditions effective for the formation of a specific peptide-antibody complex (for specific binding of the peptide to the antibody), e.g., reacting or incubating the sample and a peptide; and (3) assaying the contacted (reacted) sample for the presence of an antibody-peptide reaction (for example determining the amount of an antibody-peptide complex). The method may involve one or more washing steps, as is known in the art. Steps 2 and 3 are preferably carried out in vitro, that is. using the sample after the sample has been isolated from the subject, in a sample previously isolated from a subject.

The sample can be any suitable sample for example a sample of blood, serum, plasma, saliva, mucosal secretion, ascites fluid, or similar bodily fluid, or tissue.

Antibody-response to the peptides can be detected by different immunological/serological methods. Suitable formats of detecting presence of the antibody using the peptides includes peptide micro arrays, ELISA, chromatography, western blot, lab-on-a chip formats, microbead-based single- or multiplex immunoassays etc.

Often these methods involve proving the peptide bound to stationary phase (such as the well of an ELISA plate or the surface of a microbead) and adding the sample to be analysed in the liquid phase, allowing antibodies to bind and then washing away unbound antibodies.

Antibody binding can be detected in vitro by using a labelled secondary antibody that binds to a specific type of human antibody for example IgG, IgA, IgG1, IgG2 or IgG3, IgG4. In ELISA, the secondary antibody is labelled with an enzyme, such as horseradish peroxidase (HRP) or alkaline phosphatase (AP). The secondary antibody is suitably from another species than human, for example from rabbit or goat.

Alternatively, a fluorescence label or radioactive label can be used.

A protocol for using the peptides in an ELISA can be easily optimized by a person skilled in the art with regard to which secondary antibody to use, its dilution, buffers, blocking solution, wash etc. An outline of an example of an ELISA protocol using plates can be as follows: Polystyrene microtiter plates are coated with optimal concentrations, as determined by checkerboard titrations, of the peptides of interest dissolved in PBS at room temperature overnight. After two washes with PBS, wells are blocked with 0.1% (wt/vol) bovine serum albumin-PBS at 37° C. for 30 min. Subsequent incubations are performed at room temperature, and plates are washed three times with PBS containing 0.05% Tween (PBS-Tween) between incubations. Samples of serum or other bodily fluids are added in duplicates or triplicates in initial dilutions of for example ¹⁄₁₀, and diluted for example in a three-fold dilution series. Control samples previously tested and found to have antibodies to the peptides are used as positive controls. Samples with known concentration of antibodies may be used for creating a standard curve. Wells to which only PBS-Tween are added are used as negative controls for determination of background values. After incubation at room temperature for 90 min, HRP-labeled rabbit anti-human IgA or IgG antibodies are added and incubated for 60 min. Plates are thereafter read in a spectrophotometer 20 min after addition of $H_2O_2$ and ortho-phenylene-diamine dihydrochloride in 0.1 M sodium citrate buffer, pH 4.5. The end point titers of each sample are determined as the reciprocal interpolated dilution giving an absorbance of for example 0.4 above background at 450 nm. Alternatively, as the final read-out value, the absorbance value can be used. The skilled person recognized that this ELISA protocol is an example only and many different variants and alterations of this protocol are possible.

Alternatively, in one embodiment, B-cells are isolated from the subject, and it is analysed if the cells are able to produce antibodies that bind to the peptide. This can be done by using the ELISPOT method, ALS (antibodies in lymphocyte secretions), or similar methods.

Diagnosis can also be carried out by detecting the presence of CagA protein in tissue sample from a patient using antibodies specific for a peptide selected from peptides comprising or consisting of SEQ ID NO 32-330, SEQ ID NO 1-7, in particular SEQ ID NO 2-5. The sample is preferably a sample of gastric tissue. Antibodies with the desired binding specificity can be generated by a person skilled in the art. The antibody can be a polyclonal or a monoclonal antibody, where monoclonal antibodies are preferred. The antibody can be used in any useful format to detect the protein, for example western blot, ELISA, immunohistochemistry, etc. The antibody can be used for the diagnostic methods herein.

The method may be such that it can result in two possible outcomes: H. pylori infection present or H. pylori infection absent. H. pylori infection can for example be determined on the basis of a signal cut off in the assay. There may also be an intermediate result: outcome uncertain that warrants further investigation or re-sampling or reanalysis of samples.

Once it has been established that a CagA+ H. pylori infection is present it may be useful to treat the H. pylori infection, for example in order to decrease the risk of the subject developing gastric cancer. Treatment can be done by methods known in the art, for example with the use of antibiotics. For different reasons, some being low availability of active antibiotics in the stomach as well as problems with antibiotic resistance, there are many different antibiotic treatment regimens for H. pylori infection, and the efficacy of these generally differ in different parts of the world. In general, the treatment regimens include at least two different antibiotics selected from the groups of macrolides, beta-lactams, nitroimidazoles, tetracyclines and fluoroquinolones, with or without the addition of bismuth subcitrate potassium, where one antibiotic is preferably selected from each group. One or more antibiotics may be administered in combination with a proton pump inhibitor. One treatment includes administration of the proton pump inhibitor omeprazole, and the antibiotics amoxicillin and clarithromycin for 7 to 14 days.

Thus, there is also provided a method for preventing gastric cancer comprising the steps of 1) carrying out diagnosis as described herein on a subject and 2) treating the H. pylori infection in the subject. Preferably treatment is made so that the subject is free of H. pylori infection.

Once it has been established that a CagA+ H. pylori infection is present it may also be useful to perform further investigations to assess the presence of gastric cancer of an early or advanced stage. This may be relevant for all patients, but is of special relevance in subjects known or suspected to otherwise have a high risk of gastric cancer, such as patients originating from countries with high gastric cancer risk, subjects who are smokers, and/or subjects whose close family members are known to have been diagnosed with gastric cancer. Such investigation can be made with gastroscopy, where the stomach lining is inspected to evaluate if gastric cancer is present. If a gastric tumour is observed, the tumour may be treated by endoscopic resection, if at an early stage, or by surgery, if at an advanced stage.

Alternatively, the method can be used as a follow-up to a routine gastroscopy investigation. If the endoscopy and/or the subsequent histopathology examination discover that there are precancerous conditions present in the stomach, for example by an elevated OLGA-score, the method can be used to inform further patient handling. This can be in the form of a recommendation for appropriate time-interval for follow-up gastroscopy. For example, if it has been established that a CagA+ H. pylori infection is present, it may be beneficial to perform a follow-up gastroscopy with a shorter time-interval than if there is no CagA+ H. pylori infection present.

The peptides can be synthesized by methods known in the art. The peptides can be obtained pure and in large quantities by means of organic synthesis, such as solid phase synthesis. Methods for peptide synthesis are well known in the art, for example using a peptide synthesis machine. Of course, the peptides may be ordered from a peptide synthesis company.

The peptides can also be of animal, plant, bacterial or virus origin. The peptide may then be purified from the organism, as is known in the art. The peptide can be produced using recombinant technology, for example using eukaryotic cells, bacterial cells, or virus expression systems. It is referred to Current Protocols in Molecular Biology, (Ausubel et al, Eds.,) John Wiley & Sons, NY (current edition) for details.

H. pylori displays some genetic diversity in the CagA sequence and it may be desirable to use a peptide or a group of peptides that identifies several strains. SEQ ID NO 1 to SEQ ID NO 7 represents such a group of peptides, since 95% of all CagA+ H. pylori isolates of the world carry at least one of these sequence variants. Thus, it may be useful to provide a mixture (a "cocktail") of two or more peptides herein (SEQ ID NO 1-330). In one embodiment such a mixture comprises at least two, preferably three, more preferably four, more preferably five, more preferably six and more preferably seven peptides selected from peptides that comprise or consist of SEQ ID NO 1 to SEQ ID NO 13. In one embodiment the sequences are selected from SEQ ID NO 1 to SEQ ID NO 7. Preferred mixtures include SEQ ID NO 1, 2, 3, 4, 5, 6 and 7, SEQ ID NO SEQ ID NO 1, 2, 3, 4 and 5, SEQ ID NO 2, 3, 4, 5, 6, and 7 and SEQ ID NO 2, 3, 4 and 5. SEQ ID NO 1 to SEQ ID NO 5 are present in the so called CagA ABC, ABCC and ABCCC types, while SEQ ID NO 6 and SEQ ID NO 7 are only present in the ABD type. Thus, in one embodiment one sequence is selected from SEQ ID NO 1 to 5 and one sequence is selected from one of SEQ ID NO 6 and 7. The peptides of SEQ ID NO 6 and 7 may be particularly useful for diagnosis of H. pylori strains in Asia.

In another embodiment the peptides are selected from the peptides of SEQ ID NO 8 to SEQ ID NO 13.

Another useful way to detect more than one H. pylori strain is to use a peptide containing the motif EPIYA (SEQ ID NO 332), which is present in SEQ ID NO 8, 9, 10 and 12.

One or more peptides may be included in a kit. The kit may be used for diagnosis as described herein. A kit may comprise one or more peptides or mixtures thereof, binding buffer, and detection agents such as a secondary antibody. The kit can include a substrate that immobilizes the peptide, such as a solid support, such as microtiter plates, such as ELISA plates to which the peptide(s) of the invention have been pre-adsorbed, various diluents and buffers, labelled conjugates or other agents for the detection of specifically bound antigens or antibodies, such as secondary antibodies, and other signal-generating reagents, such as enzyme substrates, cofactors and chromogens. Other suitable components of a kit can easily be determined by one of skill in the art.

EXAMPLES

Example 1

CagA-peptides of relevance were identified using a three-step procedure, using peptide array experiments. The antibody binding signature of the peptides was analyzed by incubating the arrays with pooled or individual serum samples from *H. pylori*-infected and uninfected individuals from a dyspepsia patient cohort. The *H. pylori*-infected individuals had an infection with known CagA-status (cagA-gene present/absent).

Serum samples were obtained from individuals in Managua, Nicaragua undergoing endoscopy due to dyspepsia, as previously described (Thorell et al, BMC Evol Biol 2016: 16:53). Each of these patients had a known *H. pylori* infection status, and the genome sequences of their *H. pylori* isolates were available.

Published genomic sequences of *H. pylori* were obtained from NCBI. Available complete genomes (n=49) for *H. pylori* were downloaded from GenBank in August 2013. The experimental strains B8, Rif1, Rif2, UM298, and UM299 were removed and the remaining 44 complete strains were used for comparative genomics. The whole-genome sequenced isolates available in GenBank as of 2013-11-01 were downloaded, and all isolates containing open reading frame information were used but for strains passaged in animals or experimentally derived strains. The previously published Nicaraguan genome sequences from the Sequence Read Archive database under accession number SRP045449 were also used.

In addition to these publically available genome sequences, sequences of *H. pylori* strains isolated in Australia were obtained from professor Barry J Marshall (University of Western Australia, WA, Australia).

To identify the deduced CagA protein sequences within the available genomes, a similarity search using blastp was performed using the CagA sequence from strain 26695 (NC_000915.1). In our collection of genome sequences, 245 strains/isolates were found to contain the cagA gene, and all deduced CagA protein sequences of these isolates were used for subsequent analysis.

Example 2

Antibody-responses to CagA-peptides were assayed using peptide array analysis. Medium-density arrays were printed using laser printing synthesis technology. On these chips, around 8 600 different 15-amino acid (15-mer) *H. pylori* peptides were spotted onto each chip. Thereafter, the chips were incubated with a 1/1000-dilution of patient serum, or a 1/1000-dilution of a pool of 10 different serum samples, followed by washing and subsequent incubation by fluorochrome-conjugated rabbit anti-human-IgG antibodies. Finally, fluorescence image scanning and digital image analysis was performed to detect antibody-binding to each of the peptides on the chip. Chip printing and antibody analysis was performed by the company PEPperPRINT (Heidelberg, Germany).

Example 3

High-density arrays were made using on-chip photolithographic synthesis. In these experiments, around 200 000 different 15-mer *H. pylori* peptides were spotted onto each chip. Thereafter, the chips were incubated with 1/1000-dilution of patient serum, or a 1/1000-dilution of a pool of 10 different serum samples, followed by washing and subsequent incubation by fluorochrome-conjugated rabbit anti-human-IgG or rabbit-anti-human-IgA antibodies. Finally, fluorescence image scanning and digital image analysis was performed to detect antibody-binding to each of the peptides on the chip. Chip printing and antibody analysis was performed by the company Schafer-n (Copenhagen, Denmark).

Example 4—Identification of B-Cell Epitopes of CagA

The entire CagA-sequence was screened by assessing serum antibody-binding to overlapping 15-mer peptides and pools of serum samples. Medium-density arrays of example 2 spotted with peptides covering the entirety of the CagA-sequence, with a sequential overlap of 10 amino acids (n=234 peptides) were used. In follow-up experiments, high-density arrays of example 3 with 15-mer peptides covering the entirety of the CagA-sequence were used, but this time with a sequential overlap of 14 amino acids (n=1172 peptides). In both cases, the *H. pylori strain* 26695 was used as the source of the CagA peptide sequences. Antibody-binding to each peptide was assessed individually on the array, and two serum pools-one consisting of pooled sera from 10 *H. pylori*-infected (Hp+) individuals and the other consisting of sera from 10 uninfected (Hp−) individuals were used.

The antibody-binding of the Hp+ serum pool was compared to the binding of the H− pool. A linear B-cell epitope was defined as a stretch of at least four amino acids where the antibody-binding was at least 2× higher in the Hp+ group than in the Hp− group. In this way it was determined that *H. pylori* CagA contains 18 different linear B-cell epitopes, with an average length of 22 amino acids (Table 1 and FIG. 1). These epitopes are all useful for diagnosis of a CagA+ *H. pylori*-infection.

TABLE 1

| SEQ ID | Epitope | Amino acid sequence | Start[1] | End[1] | Length |
|---|---|---|---|---|---|
| 14 | CagA_01 | NPTKKNQYFSDFIDKSNDLI NKDNLIDVESS | 80 | 110 | 31 |
| 15 | CagA_02 | DPSKINTRSIRNFMENIIQP PIPDD | 134 | 158 | 25 |
| 16 | CagA_03 | KKQSSDVKEAINQEPVPHVQ PDIATTTTDIQGL | 223 | 255 | 33 |
| 17 | CagA_04 | PEARDLLDERGNFSKFTLGD MEMLDVEGVAD | 257 | 287 | 31 |
| 18 | CagA_05 | KAQANSQKDEIFALINKEAN RD | 650 | 671 | 22 |
| 19 | CagA_06 | SKDLKDFSKSFDEFKNGKNK DFSK | 696 | 719 | 24 |
| 20 | CagA_07 | GINPEWISKVENLNAALNEF KNGK | 735 | 758 | 24 |

TABLE 1-continued

| SEQ ID | Epitope | Amino acid sequence | Start[1] | End[1] | Length |
|---|---|---|---|---|---|
| 21 | CagA_08 | INQKVTDKVDNLNQAVS | 781 | 797 | 17 |
| 22 | CagA_09 | FSDIKKELNEKFKNFNNNNN | 870 | 889 | 20 |
| 23 | CagA_10 | KNSTEPIYAKVNKKKTG | 892 | 908 | 17 |
| 24 | CagA_11 | YTQVAKKVNAKIDRLNQIAS | 918 | 937 | 20 |
| 25 | CagA_12 | AAGFPLKRHDKVDDLSK | 945 | 961 | 17 |
| 26 | CagA_13 | GLSASPEPIYATIDD | 963 | 977 | 15 |
| 27 | CagA_14 | GGPFPLKRHDKVDDLSK | 979 | 995 | 17 |
| 28 | CagA_15 | VSEAKAGFFGNLEQTID | 1015 | 1031 | 17 |
| 29 | CagA_16 | ESAKKVPASLSAKLDNYA | 1047 | 1064 | 18 |
| 30 | CagA_17 | GAINEKATGMLTQKNPEW | 1078 | 1095 | 18 |
| 31 | CagA_18 | SEYDKIGFNQKNMKDYSDSFKFSTKLN | 1114 | 1140 | 27 |

[1]Start and end positions refer to the amino acid positions in CagA of the strain 26695.

Example 5—Identification of 15-Mer CagA Peptides with High Diagnostic Potential Individual serum samples were assayed for antibody binding to the identified epitopes, to assess the frequency with which *H. pylori*-infected individuals having or lacking CagA+ *H. pylori* react with antibodies to the different epitopes. Since the 18 epitopes each spanned more than one 15-mer peptide, again overlapping peptides were used, this time with a 10- or 11-amino acid overlap between sequential peptides. Furthermore, since there is a considerable sequence diversity of CagA in different *H. pylori* isolates, sequence variants for each peptide were included. Thus, for each overlapping 15-mer peptide sequence from 26695 CagA, every available sequence variant of this peptide was also used, if such a sequence variant was found present at least twice in our database of 245 world-wide CagA sequences. In total, 1144 different CagA peptides and sequence variants within the 18 identified epitopes were assayed using high-density arrays. Each peptide was assayed with individual serum samples (n=48) from individuals with or without CagA+ *H. pylori*-infection, and from uninfected controls.

Epitopes with a high frequency of responding individuals and a strong antibody binding would be suitable to use for diagnosis of CagA+ *H. pylori* infection. A problem with previously known methods to assess CagA-antibodies has been the high number of false-positive individuals—i.e. *H. pylori*-non-infected individuals that comes out positive in the test. Therefore, those peptides that had a good discriminatory capacity were identified: a strong antibody-response in individuals with a CagA+ infection, but a minimal response in those with an infection lacking CagA, and in *H. pylori*-uninfected individuals.

The discriminatory capacity of peptides using ROC curves were assayed and the area under the curve (AUC) of the ROC curve (ROC AUC) was used as an estimation of diagnostic capacity.

Figure 2A:
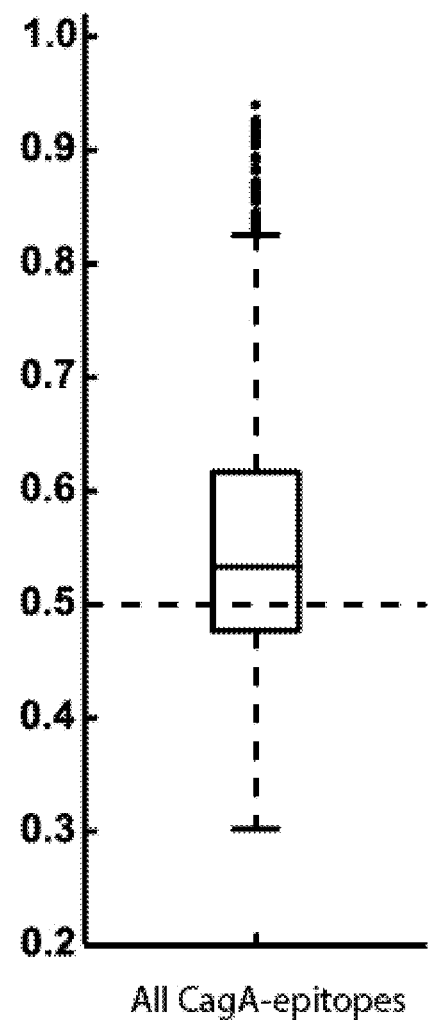
FIGS. 2A-2B show ROC AUC levels of all peptides tested from the 18 identified CagA epitopes (n=1144 peptides). In both FIGS. 2A and 2B, the AUC of a useless diagnostic (AUC=0.5) is indicated as a dashed horizontal line.

The median ROC AUC of 1144 different peptides, including sequence variants, from the 18 identified CagA epitopes was 0.53 (FIG. 2A). Since an ROC AUC of 0.53 is very close to the diagnostic accuracy of a coin-toss (i.e. not useful for diagnosis), this highlights the problem of high false-positive rates for existing serology tests relying on antibody-responses to the entire CagA protein.

Figure 2B:
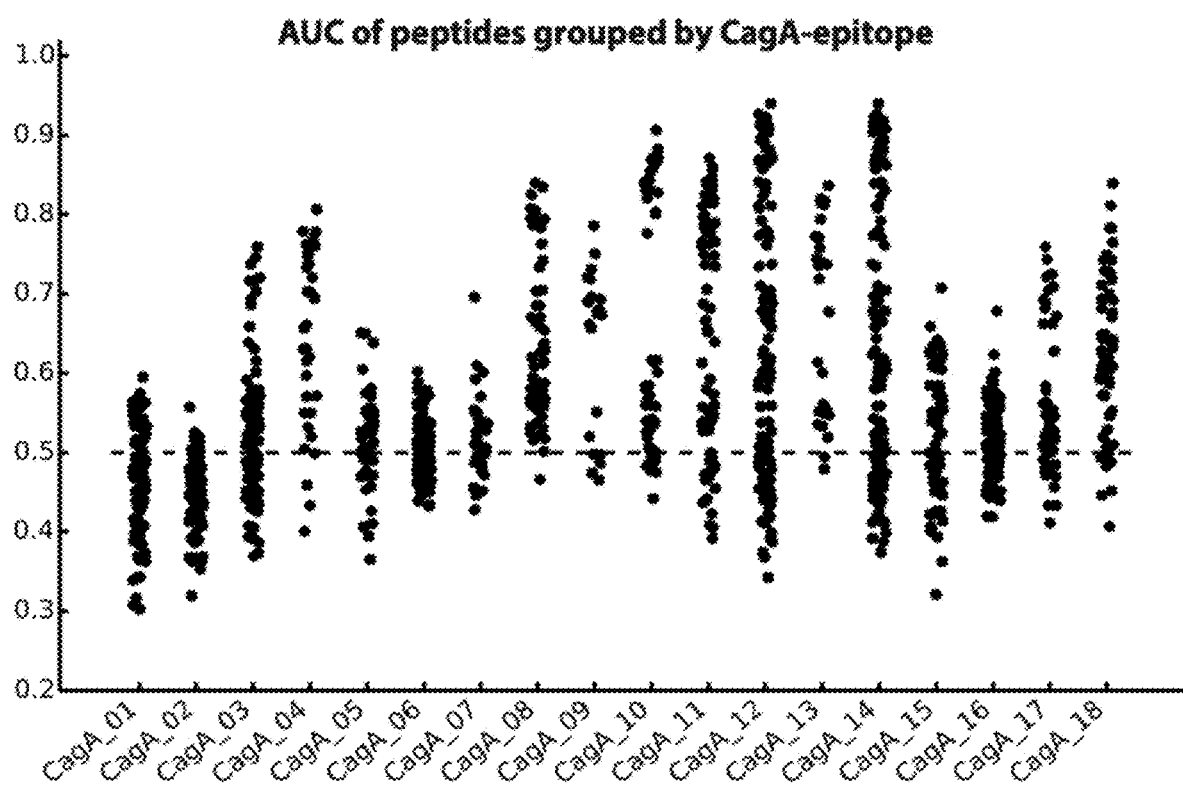
Figure 3:
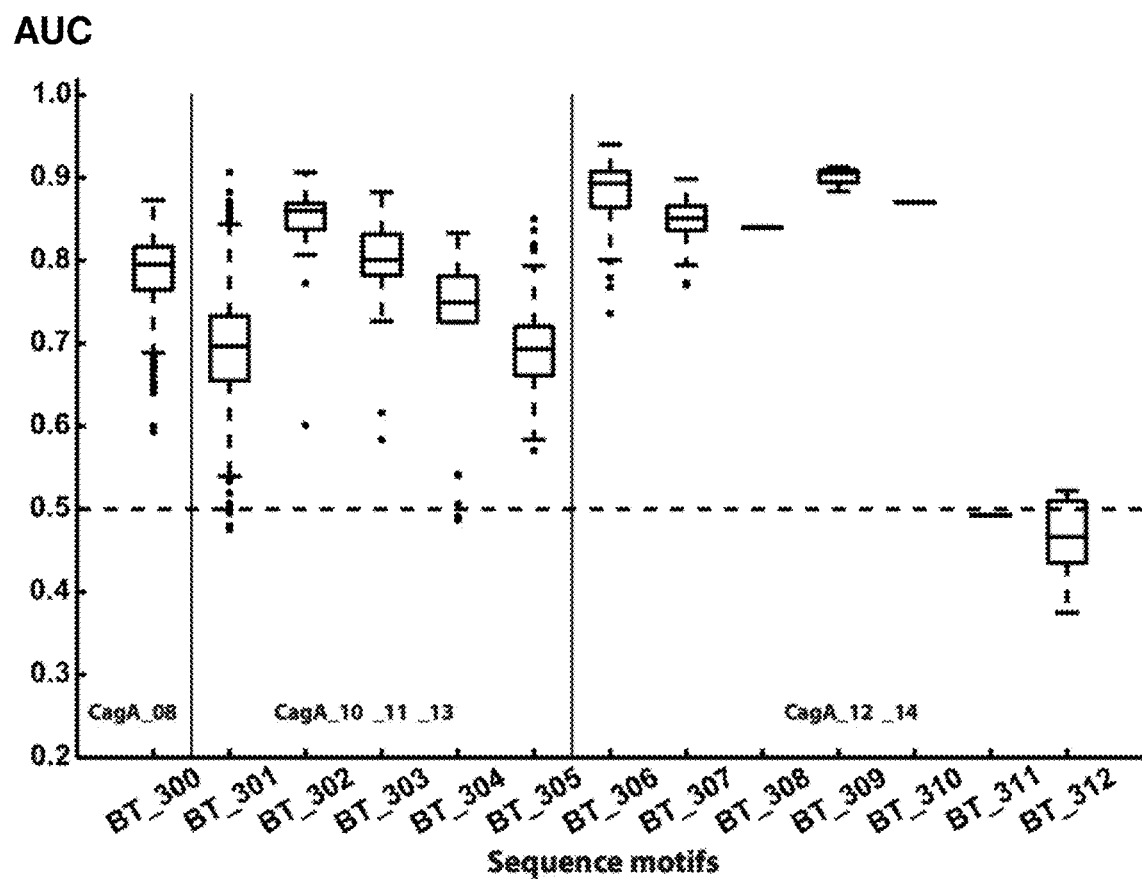
FIG. 3 shows ROC AUC scores for all peptides containing crucial sequence motifs. Data are shown as median, interquartile range and outliers. If only one peptide was tested, only the median is shown (horizontal line). The sequence motif designations are identical to the sequence names of Table 4.

There was an uneven distribution of ROC AUC among different epitopes, with epitopes 3-4, 8-14, and 17-18 containing most of the peptides with a high diagnostic capacity (FIG. 2B). Among the 1144 peptides, 176 CagA peptides with an ROC AUC higher than 0.7 were identified (Table 2). Each of these peptides can be used for diagnosis of *H. pylori* CagA+ infection.

TABLE 2

| SEQ ID NO | Name | Sequence | AUC | Epitope |
|---|---|---|---|---|
| 32 | BT_001 | DVKEAINQEPVPHVQ | 0.72 | CagA_03 |
| 33 | BT_002 | DVKEAINQEPLPHVQ | 0.76 | |
| 34 | BT_003 | DVKEAINQEPVPHIQ | 0.74 | |
| 35 | BT_004 | DVKEAINQEPVPNVQ | 0.72 | |
| 36 | BT_005 | TTTHIQGLPPESRDL | 0.70 | |
| 37 | BT_006 | TTTPIQGLPPESRDL | 0.72 | |
| 38 | BT_007 | TPTHIQGLPPEARDL | 0.75 | |
| 39 | BT_008 | QGLPPESRDLLDERG | 0.73 | CagA_04 |
| 40 | BT_009 | QGLPPEARDLLDERG | 0.75 | |
| 41 | BT_010 | QSLPPEARDLLDERG | 0.78 | |
| 42 | BT_0i1 | QGLPLEARDLLDERG | 0.74 | |
| 43 | BT_012 | ESRDLLDERGNFSKF | 0.72 | |
| 44 | BT_013 | LDERGNFFKFTLGDM | 0.70 | |
| 45 | BT_014 | NFSKFTLGDMEMLDV | 0.76 | |
| 46 | BT_015 | NFFKFTLGDVEMLDV | 0.70 | |
| 47 | BT_016 | NFSKFTLGDMNMLDV | 0.81 | |
| 48 | BT_017 | DFSKFTLGDMEMLDV | 0.77 | |
| 49 | BT_018 | NFFKFTLGDMEMLDV | 0.75 | |
| 50 | BT_019 | NFPKFTLGDMEMLDV | 0.78 | |
| 51 | BT_020 | NFSKFTLGDVEMLDV | 0.76 | |
| 52 | BT_021 | IKDVIINQEITDKVD | 0.74 | CagA_08 |
| 53 | BT_022 | IINQKITDKVDNLNQ | 0.81 | |
| 54 | BT_023 | IINQKVTDKVDNLNQ | 0.83 | |
| 55 | BT_024 | IINQKITDKVDDLNQ | 0.79 | |
| 56 | BT_025 | IINQKITDKVDNLSQ | 0.78 | |
| 57 | BT_026 | IINQKITDKVDNLSS | 0.84 | |
| 58 | BT_027 | IINQKVTDKVDDLNQ | 0.79 | |
| 59 | BT_028 | IINQEITDKVDNLNQ | 0.76 | |
| 60 | BT_029 | IINQKITDKADNLNQ | 0.80 | |
| 61 | BT_030 | IINQKVTDKVDNLSS | 0.80 | |
| 62 | BT_031 | IINQKITDKVDSLNQ | 0.84 | |
| 63 | BT_032 | IINQKITDKVENLNQ | 0.73 | |
| 64 | BT_033 | HINQQITDKVDNLNQ | 0.79 | |
| 65 | BT_034 | IFNQKITDKVDDLNQ | 0.79 | |
| 66 | BT_035 | ITDKVDNLNQAVSIA | 0.70 | |
| 67 | BT_036 | ITDKVDNLNQAVSEA | 0.70 | |
| 68 | BT_037 | TLAKNFSDIKKELNE | 0.73 | CagA_09 |
| 69 | BT_038 | TLSKNFSDIKKELNE | 0.72 | |
| 70 | BT_039 | NLAKNFSDIKKELNE | 0.72 | |
| 71 | BT_040 | NFSDIKKELNEKFKN | 0.79 | |
| 72 | BT_041 | NFSDIKKELNEKLFG | 0.75 | |
| 73 | BT_042 | KNSTEPIYAKVNKKK | 0.84 | CagA_10 |
| 74 | BT_043 | GLKNEPIYAKVNKKK | 0.87 | |
| 75 | BT_044 | KNNTEPIYAQVNKKK | 0.80 | |
| 76 | BT_045 | KNSGEPIYAQVNKKK | 0.78 | |
| 77 | BT_046 | KGPEEPIYAKVNKKK | 0.83 | |
| 78 | BT_047 | KNSAEPIYAQVNKKK | 0.80 | |
| 79 | BT_048 | KNSGEPIYAKVNKKK | 0.84 | |
| 80 | BT_049 | KNSAEPIYAKVNKKK | 0.86 | |
| 81 | BT_050 | ENSTEPIYAKVNKKK | 0.91 | |
| 82 | BT_051 | KNNEEPIYAQVNKKK | 0.88 | |
| 83 | BT_052 | KNNTEPIYAKVNKKK | 0.86 | |
| 84 | BT_053 | EPIYAKVNKKKTGQV | 0.87 | |
| 85 | BT_054 | EPIYAQVNKKKTGQV | 0.85 | |
| 86 | BT_055 | EPIYAKVNKKKAGQA | 0.87 | |
| 87 | BT_056 | EPIYAKVNKKKTGQA | 0.87 | |
| 88 | BT_057 | EPIYAKVNKKKAGQV | 0.87 | |

TABLE 2-continued

| SEQ ID NO | Name | Sequence | AUC | Epitope |
|---|---|---|---|---|
| 89 | BT_058 | EPIYAQVNKKKTGQA | 0.83 | |
| 90 | BT_059 | EPIYAQVNKKKAGQA | 0.82 | |
| 91 | BT_060 | EPIYAQVNKKKAGQV | 0.83 | |
| 92 | BT_061 | EPIYAKVNKKKTGEV | 0.84 | |
| 93 | BT_062 | EPIYAKVNKKKTEQA | 0.87 | |
| 94 | BT_063 | VASPEEPIYAQVAKK | 0.78 | CagA_11 |
| 95 | BT_064 | VASPEEPIYTQVAKK | 0.78 | |
| 96 | BT_065 | AASPEEPIYAQVAKK | 0.79 | |
| 97 | BT_066 | ATSPEEPIYAQVAKK | 0.80 | |
| 98 | BT_067 | AASLEEPIYAQVAKK | 0.78 | |
| 99 | BT_068 | AASPEEPIYTQVAKK | 0.76 | |
| 100 | BT_069 | AASHEEPIYAQVAKK | 0.79 | |
| 101 | BT_070 | VASLEEPIYTQVAKK | 0.75 | |
| 102 | BT_071 | LENSTEPIYTQVAKK | 0.74 | |
| 103 | BT_072 | ASPEEPVYTQVAKMV | 0.81 | |
| 104 | BT_073 | VASHEEPIYAQVAKK | 0.79 | |
| 105 | BT_074 | EEPIYAQVAKKVNAK | 0.86 | |
| 106 | BT_075 | EEPIYTQVAKKVNAK | 0.79 | |
| 107 | BT_076 | EEPIYAQVAKKVSAK | 0.87 | |
| 108 | BT_077 | EEPIYAQVAKKVTQK | 0.86 | |
| 109 | BT_078 | EEPIYAQVAKKVTKK | 0.82 | |
| 110 | BT_079 | EEPIYTQVAKKVTKK | 0.77 | |
| 111 | BT_080 | EEPIYTQVAKKVKAK | 0.76 | |
| 112 | BT_081 | EEPIYTQVAKKVTQK | 0.80 | |
| 113 | BT_082 | TEPIYTQVAKKVKAK | 0.75 | |
| 114 | BT_083 | EEPVYTQVAKMVTQK | 0.77 | |
| 115 | BT_084 | AQVAKKVNAKIDRLN | 0.83 | |
| 116 | BT_085 | AQVAKKVSAKIDQLN | 0.81 | |
| 117 | BT_086 | TQVAKKVNAKIDRLN | 0.82 | |
| 118 | BT_087 | AQVAKKVNAKIDQLN | 0.83 | |
| 119 | BT_088 | TQVAKKVNAKIDQLN | 0.84 | |
| 120 | BT_089 | TQVAKKVKAKIDQLN | 0.73 | |
| 121 | BT_090 | TQVAKKVTQKIDQLN | 0.71 | |
| 122 | BT_091 | KKVNAKIDRLNQIAS | 0.84 | |
| 123 | BT_092 | KKVNAKIDQLNQAAS | 0.84 | |
| 124 | BT_093 | KKVNAKIDRLNQIAS | 0.85 | |
| 125 | BT_094 | KKVNAKIDRLNQAAS | 0.83 | |
| 126 | BT_095 | KKVKAKIDQLNQAAS | 0.78 | |
| 127 | BT_096 | KKVNAKIDRLNQIAR | 0.84 | |
| 128 | BT_097 | KKVSAKIDQLNQAAS | 0.81 | |
| 129 | BT_098 | GVGQAAGFPLKRHDK | 0.87 | CagA_12/ CagA_14 |
| 130 | BT_099 | GVGQAAGFPLKKHDK | 0.84 | |
| 131 | BT_100 | GVGQAAGFPLKKHGK | 0.77 | |
| 132 | BT_101 | GVGQAASFPLKRHDK | 0.81 | |
| 133 | BT_102 | GVGRAAGFPLKRHDK | 0.87 | |
| 134 | BT_103 | GVGQAVGFPLKRHDK | 0.87 | |
| 135 | BT_104 | GVGKAAGFPLKRHDK | 0.89 | |
| 136 | BT_105 | DVGQAANFLLKRHDK | 0.78 | |
| 137 | BT_106 | VVGQAVGFPLKRHDK | 0.89 | |
| 138 | BT_107 | GVGQAAGYPLKRHDK | 0.88 | |
| 139 | BT_108 | GVGQATGFPLKRHDK | 0.87 | |
| 140 | BT_109 | GVGQVAGFPLKKHGK | 0.77 | |
| 141 | BT_110 | VGQAGFPLKRHDKVD | 0.91 | |
| 142 | BT_111 | VGQAGFPLKRHDKVE | 0.92 | |
| 143 | BT_112 | VGQAGFPLKKHAKVE | 0.82 | |
| 144 | BT_113 | VNQAGFPLKRHDKVD | 0.91 | |
| 145 | BT_114 | VGQAGFLLKRHDKVD | 0.88 | |
| 146 | BT_115 | AGFPLKRHDKVDDLS | 0.91 | |
| 147 | BT_116 | GPFPLKRHDKVDDLS | 0.91 | |
| 148 | BT_117 | AGFPLKRHDKVEDLS | 0.91 | |
| 149 | BT_118 | AGFPLKKHDKVDDLS | 0.87 | |
| 150 | BT_119 | AGFPLKKHAKVEDLS | 0.87 | |
| 151 | BT_120 | AGFPLKKHDKVEDLS | 0.86 | |
| 152 | BT_121 | ASFPLKRHDKVDDLS | 0.90 | |
| 153 | BT_122 | EGFPLKRHDKVDDLS | 0.94 | |
| 154 | BT_123 | AGFPLKKHGKVDDLS | 0.86 | |
| 155 | BT_124 | AGFPLKRHDKVGDLS | 0.93 | |
| 156 | BT_125 | GSFPLKRHDKVEDLS | 0.92 | |
| 157 | BT_126 | AGYPLKRHDKVDDLS | 0.91 | |
| 158 | BT_127 | GSSPLKRHAKVDDLS | 0.88 | |
| 159 | BT_128 | TGFPLKRHDKVDDLS | 0.92 | |
| 160 | BT_129 | GPFPLKKHAKVDDLS | 0.84 | |
| 161 | BT_130 | LKRHDKVDDLSKVGL | 0.84 | |
| 162 | BT_131 | LKRHDKVDDLSKVGR | 0.83 | |
| 163 | BT_132 | LKRHDKVEDLSKVGR | 0.76 | |
| 164 | BT_133 | LKRHDKVEDLSKVGL | 0.70 | |
| 165 | BT_134 | LKRHDKVGDLSKVGL | 0.73 | |
| 166 | BT_135 | LKKHDKVEDLSKVGR | 0.71 | |
| 167 | BT_136 | LKKHDKVDDLSKVGR | 0.81 | |
| 168 | BT_137 | LKRHAKVDDLSKVGL | 0.79 | |
| 169 | BT_138 | LKKHDKVDDLSKVGL | 0.81 | |
| 170 | BT_139 | LKKHGKVDDLSKVGL | 0.74 | |
| 171 | BT_140 | RSVSPEPIYATIDDL | 0.84 | CagA_13 |
| 172 | BT_141 | LSASPEPIYATIDDL | 0.82 | |
| 173 | BT_142 | SASPEPIYATIDFDE | 0.72 | |
| 174 | BT_143 | LSANPEPIYATIDDL | 0.81 | |
| 175 | BT_144 | RLDSPEPIYATIDDL | 0.82 | |
| 176 | BT_145 | LSANHEPIYATIDDL | 0.77 | |
| 177 | BT_146 | NSDRSEPIYATIDDL | 0.74 | |
| 178 | BT_147 | LSASPEPIYATIDEL | 0.82 | |
| 179 | BT_148 | PEPIYATIDDLGGPF | 0.81 | |
| 180 | BT_149 | PEPIYATIDDLGGSF | 0.79 | |
| 181 | BT_150 | PEPIYATIDELGGPF | 0.77 | |
| 182 | BT_151 | SEPIYATIDDLGGPF | 0.76 | |
| 183 | BT_152 | HEPIYATIDDLDGPF | 0.74 | |
| 184 | BT_153 | HEPIYATIDDLGGPF | 0.74 | |
| 185 | BT_154 | EPIYATIDDLDGSSP | 0.74 | |
| 186 | BT_155 | IDDLGGPFPLKRHDK | 0.91 | CagA_14 |
| 187 | BT_156 | RHDKVDDLSKVGRSV | 0.70 | |
| 188 | BT_157 | DLNQAVSEAKIGHFD | 0.71 | CagA_15 |
| 189 | BT_158 | NGAINEKATGMLTQK | 0.76 | CagA_17 |
| 190 | BT_159 | NGTINEKATGMLTQK | 0.71 | |
| 191 | BT_160 | SGTINEKATGMLTQK | 0.70 | |
| 192 | BT_161 | TGTINEKATGMLTQK | 0.74 | |
| 193 | BT_162 | EKATGMLTQKNPEWL | 0.72 | |
| 194 | BT_163 | EKVTGMLTQKNPEWL | 0.72 | |
| 195 | BT_164 | LSEYDKIGFNQKNMK | 0.74 | CagA_18 |
| 196 | BT_165 | LSAYDKIGFNQKNMK | 0.78 | |
| 197 | BT_166 | LSDYDKIGFNQKNMK | 0.81 | |
| 198 | BT_167 | LSEYDNIGFNQKNMK | 0.76 | |
| 199 | BT_168 | LLEYDKIGFNQKNMK | 0.73 | |
| 200 | BT_169 | LSEYDKIGFSQKNMK | 0.74 | |
| 201 | BT_170 | LSEYDKIGFNQKSMK | 0.84 | |
| 202 | BT_171 | LSDYDKIGFNQKDMK | 0.78 | |
| 203 | BT_172 | KDYSDSFKFSTKLNN | 0.73 | |
| 204 | BT_173 | KDYSDSFKFSTKLSN | 0.71 | |
| 205 | BT_174 | KDYSDSFKFSTKLND | 0.72 | |
| 206 | BT_175 | KDYSDSFKFSTRLNN | 0.75 | |
| 207 | BT_176 | KDYSDSFKFSIKLSN | 0.72 | |

Example 6

Even a diagnostic with an ROC AUC of less than 0.7 may have a diagnostic capacity. In order to assess this, peptides to which a consistent fraction of CagA+ individuals had an antibody-response, but to which none of the individuals with a CagA-negative strain or lacking an H. pylori infection had such a response were identified. In this way 123 peptides with an ROC AUC of less than 0.7, for which the true-positive rate was more than 10% and the false-positive rate was 0%, were identified (Table 3). Each of these peptides can also be used for diagnosis of *H. pylori* CagA+ infection.

TABLE 3

| SEQ ID NO | Name | Sequence | AUC[1] | FPR[2] | TPR[3] | Epitope |
|---|---|---|---|---|---|---|
| 208 | BT_177 | NKSNDLINKDALIDV | 0.49 | 0 | 14 | CagA_01 |
| 209 | BT_178 | TTTDIQGLPPESRDL | 0.69 | 0 | 11 | CagA_03 |

TABLE 3-continued

| SEQ ID NO | Name | Sequence | AUC[1] | FPR[2] | TPR[3] | Epitope |
|---|---|---|---|---|---|---|
| 210 | BT_179 | STTHIQGLPPESRDL | 0.66 | 0 | 11 | |
| 211 | BT_180 | SFIFDKKQSSDVKEA | 0.55 | 0 | 11 | |
| 212 | BT_181 | SFVFDKKQSSDLKET | 0.54 | 0 | 11 | |
| 213 | BT_182 | SFAFDKKQSSDLKET | 0.53 | 0 | 11 | |
| 214 | BT_183 | ESRDLLDERGNFFKF | 0.66 | 0 | 14 | CagA_04 |
| 215 | BT_184 | EARDLLDERGDFSKF | 0.63 | 0 | 14 | |
| 216 | BT_185 | EARDLLDERGNFFKF | 0.62 | 0 | 14 | |
| 217 | BT_186 | LTPEARKLLEEAKKS | 0.52 | 0 | 14 | |
| 218 | BT_187 | NSQKDEIFALISKEA | 0.65 | 0 | 11 | CagA_05 |
| 219 | BT_188 | NSQKDEIFALINQET | 0.65 | 0 | 11 | |
| 220 | BT_189 | NSQKNEIFALINKEA | 0.64 | 0 | 11 | |
| 221 | BT_190 | NSQKDEIFKLINEGA | 0.57 | 0 | 11 | |
| 222 | BT_191 | NSQKDEILALINKEA | 0.52 | 0 | 11 | |
| 223 | BT_192 | VNKDLKDFSKSFDEF | 0.58 | 0 | 14 | CagA_06 |
| 224 | BT_193 | INKDLDLKDFSKSFDDF | 0.58 | 0 | 14 | |
| 225 | BT_194 | INKNLKDFSKSFDEF | 0.58 | 0 | 14 | |
| 226 | BT_195 | ISKDLKDFSKSFDEF | 0.56 | 0 | 14 | |
| 227 | BT_196 | KSFDGFKNGKNKDFs | 0.56 | 0 | 11 | |
| 228 | BT_197 | KIENLNVALNDFKNG | 0.55 | 0 | 11 | CagA_07 |
| 229 | BT_198 | EWISKIENLNVALND | 0.54 | 0 | 11 | |
| 230 | BT_199 | EWVSKVENLNAALNE | 0.53 | 0 | 11 | |
| 231 | BT_200 | EWISKVENLNAALND | 0.53 | 0 | 11 | |
| 232 | BT_201 | KVENLNAALNEFKNS | 0.52 | 0 | 11 | |
| 233 | BT_202 | KVENLNAALNEFKSG | 0.50 | 0 | 11 | |
| 234 | BT_203 | EWISKIENLNAALND | 0.49 | 0 | 11 | |
| 235 | BT_204 | IINQKITDKVGNLSS | 0.69 | 0 | 18 | CagA_08 |
| 236 | BT_205 | ITDKVDNLNQAVLVA | 0.67 | 0 | 18 | |
| 237 | BT_206 | KVDNLNQAVSEAKAT | 0.67 | 0 | 22 | |
| 238 | BT_207 | KVDNLNQAVSEAKLT | 0.66 | 0 | 14 | |
| 239 | BT_208 | VTDKVDNLNQAVSIA | 0.65 | 0 | 14 | |
| 240 | BT_209 | ITDKVDNLNQAVSMA | 0.64 | 0 | 11 | |
| 241 | BT_210 | VTDKVDNLNQEVSVA | 0.63 | 0 | 11 | |
| 242 | BT_211 | VTDKVDNLNQAVSMA | 0.62 | 0 | 14 | |
| 243 | BT_212 | ITDKVDNLNQAVSET | 0.62 | 0 | 11 | |
| 244 | BT_213 | VTDKVDNLNQAVSVA | 0.61 | 0 | 14 | |
| 245 | BT_214 | ITDKVDNLNQAVSVA | 0.61 | 0 | 11 | |
| 246 | BT_215 | KVDNLNQAVSIAKET | 0.59 | 0 | 25 | |
| 247 | BT_216 | KVDNLNQAVSVAKIT | 0.59 | 0 | 25 | |
| 248 | BT_217 | ITDKVDDLNQAVSVA | 0.59 | 0 | 11 | |
| 249 | BT_218 | KVDNLNQAVSIAKAT | 0.57 | 0 | 25 | |
| 250 | BT_219 | KVDNLSQAVSVAKIA | 0.56 | 0 | 11 | |
| 251 | BT_220 | KVDDLNQAVSVAKAT | 0.56 | 0 | 14 | |
| 252 | BT_221 | ITDKVDDLNQAVLVA | 0.56 | 0 | 11 | |
| 253 | BT_222 | ITNKVDDLNQAVSVA | 0.52 | 0 | 11 | |
| 254 | BT_223 | KVDNLSSAVSVAKAM | 0.52 | 0 | 11 | |
| 255 | BT_224 | VTDKVDDLNQAVSVA | 0.52 | 0 | 11 | |
| 256 | BT_225 | ITDKVDDLNQAVSMA | 0.50 | 0 | 11 | |
| 257 | BT_226 | TLSKNFSDIKKELNA | 0.68 | 0 | 22 | CagA_09 |
| 258 | BT_227 | TLTKKFSDIKKELNE | 0.68 | 0 | 18 | |
| 259 | BT_228 | NLTKNFSDIRKELNE | 0.67 | 0 | 11 | |
| 260 | BT_229 | TLTKNFSDIRKELNE | 0.66 | 0 | 14 | |
| 261 | BT_230 | NEKFKNFNNNNNGLK | 0.55 | 0 | 14 | |
| 262 | BT_231 | NSNGLKNSAEPIYAQ | 0.62 | 0 | 11 | CagA_10 |
| 263 | BT_232 | NNNGLKNSTEPIYAK | 0.60 | 0 | 11 | |
| 264 | BT_233 | TQVAKKVKAKIDRLD | 0.67 | 0 | 11 | CagA_11 |
| 265 | BT_234 | TQVAKKVTKKIDQLN | 0.61 | 0 | 11 | |
| 266 | BT_235 | RHDKVDDLSKIGRSV | 0.69 | 0 | 14 | CagA_12 |
| 267 | BT_236 | RHDKVDDLSKVGLSR | 0.69 | 0 | 22 | |
| 268 | BT_237 | KHAKVDDLSKVGRSV | 0.68 | 0 | 14 | |
| 269 | BT_238 | RHDKVDDLSKVGLSR | 0.68 | 0 | 18 | |
| 270 | BT_239 | LKRYAKVDDLSKVGL | 0.68 | 0 | 25 | |
| 271 | BT_240 | RHDKVDDLSKVGRSR | 0.66 | 0 | 18 | |
| 272 | BT_241 | LKRYAKVDDLSKAGR | 0.66 | 0 | 22 | |
| 273 | BT_242 | RYAKVDDLSKVGLSR | 0.63 | 0 | 18 | |
| 274 | BT_243 | KVDDLSKVGLSANHE | 0.62 | 0 | 14 | |
| 275 | BT_244 | KVDDLSKVGLSREQE | 0.60 | 0 | 14 | |
| 276 | BT_245 | KVDDLTKVGFSREQE | 0.60 | 0 | 11 | |
| 277 | BT_246 | KVDDLSKVGLSANPE | 0.60 | 0 | 14 | |
| 278 | BT_247 | VGQAFPFKKHAKVE | 0.59 | 0 | 11 | |
| 279 | BT_248 | GSSPLKRYAKVDDLS | 0.56 | 0 | 11 | |
| 280 | BT_249 | PEPIYATIDFDDANQ | 0.68 | 0 | 18 | CagA_13 |
| 281 | BT_250 | PEPIYATIDFDEANQ | 0.61 | 0 | 18 | |
| 282 | BT_251 | AVSEAKAGFFGNLEQ | 0.66 | 0 | 14 | CagA_15 |
| 283 | BT_252 | KAGFFGNLEQTIDKL | 0.64 | 0 | 18 | |
| 284 | BT_253 | AVSEAKAGFFGNLER | 0.64 | 0 | 14 | |
| 285 | BT_254 | KAGFFGNLEQTIGNL | 0.64 | 0 | 18 | |
| 286 | BT_255 | KVGFFGNLEQTIDKL | 0.63 | 0 | 11 | |
| 287 | BT_256 | AVSEAKVGFFGNLEQ | 0.63 | 0 | 11 | |
| 288 | BT_257 | KAGFFGNLEQTIDNL | 0.63 | 0 | 22 | |
| 289 | BT_258 | KAGFFGNLEQTINNL | 0.63 | 0 | 14 | |
| 290 | BT_259 | KAGYFGNLEQTIDNL | 0.63 | 0 | 14 | |
| 291 | BT_260 | KAGFFGNLERTIDKL | 0.62 | 0 | 25 | |
| 292 | BT_261 | AVSEAKSGFFGNLEQ | 0.62 | 0 | 14 | |
| 293 | BT_262 | KAGFFGNLEQTMDRL | 0.61 | 0 | 18 | |
| 294 | BT_263 | KAGYFGNLERTIDKL | 0.61 | 0 | 25 | |
| 295 | BT_264 | KAGFFGNLERTIDNL | 0.61 | 0 | 18 | |
| 296 | BT_265 | AVSEAKAGYFGNLEQ | 0.54 | 0 | 14 | |
| 297 | BT_266 | KVPDSLSAKLDNYAT | 0.62 | 0 | 14 | CagA_16 |
| 298 | BT_267 | MNLWAESAKKVPAGL | 0.58 | 0 | 11 | |
| 299 | BT_268 | VNLWAESAKKVPVSL | 0.57 | 0 | 14 | |
| 300 | BT_269 | KVPASLLEKLDNYAT | 0.56 | 0 | 18 | |
| 301 | BT_270 | MNLWAESAKKVPASL | 0.55 | 0 | 11 | |
| 302 | BT_271 | VNLWAENAKKLPASL | 0.54 | 0 | 11 | |
| 303 | BT_272 | VESAKQVPAGLQAKL | 0.48 | 0 | 11 | |
| 304 | BT_273 | NGGINEKATGMLTQK | 0.69 | 0 | 14 | CagA_17 |
| 305 | BT_274 | EKAIGMLTQKNPEWL | 0.66 | 0 | 11 | |
| 306 | BT_275 | EKATGVLTQKNPEWL | 0.63 | 0 | 11 | |
| 307 | BT_276 | EKATGMLMQKNPEWL | 0.58 | 0 | 11 | |
| 308 | BT_277 | KDYSDSFKFSTKLNS | 0.69 | 0 | 37 | CagA_18 |
| 309 | BT_278 | GSVPLSAYDKIGFNQ | 0.69 | 0 | 18 | |
| 310 | BT_279 | GSVSLSEYDKIGFNQ | 0.69 | 0 | 22 | |
| 311 | BT_280 | GSTHLSEYDKIGFNQ | 0.67 | 0 | 18 | |
| 312 | BT_281 | LSEYDNIGFSQKNMK | 0.65 | 0 | 11 | |
| 313 | BT_282 | GSAHLSEYDKIGFNQ | 0.64 | 0 | 18 | |
| 314 | BT_283 | GSAPLSDYDKIGFNQ | 0.64 | 0 | 18 | |
| 315 | BT_284 | DSFKFSTKLNSAIKD | 0.64 | 0 | 18 | |
| 316 | BT_285 | GSVPLSEYDKIGFNQ | 0.64 | 0 | 22 | |
| 317 | BT_286 | GSAPLSEYDNIGFSQ | 0.63 | 0 | 11 | |
| 318 | BT_287 | GSAPLSEYDKIGFNQ | 0.62 | 0 | 22 | |
| 319 | BT_288 | GSAPLSAYDKIGFNQ | 0.62 | 0 | 22 | |
| 320 | BT_289 | DSFKFSTKLNDAVKD | 0.62 | 0 | 18 | |
| 321 | BT_290 | DSFKFSTKLNNAVKN | 0.61 | 0 | 14 | |
| 322 | BT_291 | GSVPLSEYDNIGFNQ | 0.61 | 0 | 22 | |
| 323 | BT_292 | DSFKFSTKLNNAVKD | 0.61 | 0 | 14 | |
| 324 | BT_293 | DSFKFSTKLSNAVKN | 0.61 | 0 | 11 | |
| 325 | BT_294 | DSFKFSTRLNNAVKD | 0.60 | 0 | 11 | |
| 326 | BT_295 | GSTPLSDYDKIGFNQ | 0.60 | 0 | 22 | |
| 327 | BT_296 | DSFKFSTELNNAVKD | 0.60 | 0 | 11 | |
| 328 | BT_297 | GSTPLSDYDKIGFNQ | 0.59 | 0 | 22 | |
| 329 | BT_298 | DSFKFSTKLSNAVKD | 0.57 | 0 | 11 | |
| 330 | BT_299 | DSFKFSTKSNNAVKD | 0.55 | 0 | 14 | |

[1]AUC—Area under the curve for the Receiver Operating Characteristic (ROC) curve.
[2]FPR—False-positive rate (%) based on a cut-off set to the 95th percentile of all the peptides tested (n = 1144 peptides).
[3]TPR—True-positive rate (%) based on a cut-off set to the 95th percentile of all the peptides tested (n = 1144 peptides).

Example 7—Identification of Crucial Amino-Acid Sequences for Diagnosing a CagA+ *H. pylori* Infection A detailed mapping of B-cell epitopes of *H. pylori* CagA within peptides identified as highly diagnostic was performed. Mapping was performed using high-density peptide arrays. Individual serum samples (n=48) were tested for antibody-binding to sequence variants of each of the selected peptides. This was done in order to pin-point amino acid positions in each peptide that contributed to antibody-binding, and therefore would be crucial to include in a diagnostic application.

We selected the peptides with the highest diagnostic potential, and for each of the selected peptides we created 300 different sequence variants. This was done by so-called complete single-residue substitution. This means that for each of the 15 amino-acid positions of each peptide, we created 20 different sequence variants that only differed in sequence in that position; in that position, the 20 variants had one each of the 20 different common protein amino acids. Since there were 20 different sequence variants per amino acid position, and the peptides were of 15 amino acids length, there were in total 300 different sequence variants. The procedure has been described previously (Hansen et al, PLOS One 2013:8(7):e68902). This analysis determined if a given residue position within the peptide is unimportant for binding of the peptide to the antibody, i.e. if the amino acid residues in the native sequence can be freely substituted without affecting binding.

In this way all variants of the selected peptides were tested for antibody-binding by each of the 48 serum samples. We observed which peptide variants obtained significantly/substantially lower ROC AUC-scores than the original peptide, and based on this information we could identify the sequence motifs that were crucial for discriminatory capacity of CagA+ *H. pylori* infection.

It was revealed that the crucial parts of the peptides span between 5-6 amino acids, and that there is redundancy in some of the positions of these crucial sequences. The crucial sequences for certain epitopes are shown in Table 4, and their ROC AUC levels in FIG. 3. The peptides of table 4 are particularly useful for diagnosis and treatment of *H. pylori* infection and gastric cancer, including prevention of cancer, since they are highly specific.

TABLE 4

| SEQ ID NO | Name | Sequence[1] | AUC[2] | n[3] | Epitope(s) |
|---|---|---|---|---|---|
| 13 | BT_300 | IINQKVTDK VDNLNQ[4] | 0.80 (0.77-0.82) | 298 | CagA_08 |
| 8 | BT_301 | EPIYA | 0.70 (0.66-0.73) | 283 | CagA_10_11_13 |
| 9 | BT_302 | EPIYAK | 0.86 (0.84-0.87) | 16 | CagA_10 |
| 10 | BT_303 | EPIYAQ | 0.80 (0.78-0.83) | 21 | CagA_10_11 |
| 11 | BT_304 | EPIYT | 0.75 (0.73-0.78) | 21 | CagA_11 |
| 12 | BT_305 | EPIYAT | 0.70 (0.66-0.72) | 211 | CagA_13 |
| 1 | BT_306 | FXLKRHX | 0.90 (0.87-0.91) | 275 | CagA_12_14 |
| 2 | BT_307 | FXLKKHX | 0.85 (0.84-0.87) | 34 | |
| 3 | BT_308 | FXLKQHX | 0.84 N.A. | 1 | |
| 4 | BT_309 | YXLKRHX | 0.91 (0.89-0.91) | 3 | |
| 5 | BT_310 | IXLKRHX | 0.87 N.A. | 1 | |
| 6 | BT_311 | FXLRRYX | 0.49 N.A. | 1 | |
| 7 | BT_312 | FXLRRSX | 0.47 (0.44-0.51) | 7 | |

[1]An "X" means any one amino acid as described herein.
[2]AUC is expressed as median, with interquartile range in brackets (N. A = not applicable).
[3]Number of different 15-mer peptide sequences tested.
[4]The AUC data of Seq ID NO 13 includes sequence variants of sequence 13. The data includes all peptides with an exact match in at least 12 out of the 15 amino acids.

SEQUENCE LISTING

```
Sequence total quantity: 332
SEQ ID NO: 1           moltype = AA  length = 7
FEATURE                Location/Qualifiers
VARIANT                2
VARIANT                2
                       note = Xaa is any amino acid
VARIANT                7
                       note = Xaa is any amino acid
source                 1..7
                       mol_type = protein
                       organism = Helicobacter pylori
SEQUENCE: 1
FXLKRHX                                                    7

SEQ ID NO: 2           moltype = AA  length = 7
FEATURE                Location/Qualifiers
REGION                 1..7
                       note = 325
VARIANT                2
                       note = Xaa is any amino acid
VARIANT                7
                       note = Xaa is any amino acid
source                 1..7
                       mol_type = protein
                       organism = Helicobacter pylori
SEQUENCE: 2
FXLKKHX                                                    7

SEQ ID NO: 3           moltype = AA  length = 7
FEATURE                Location/Qualifiers
VARIANT                2
                       note = Xaa is any amino acid
VARIANT                7
                       note = Xaa is any amino acid
source                 1..7
                       mol_type = protein
                       organism = Helicobacter pylori
```

```
SEQUENCE: 3
FXLKQHX                                                                          7

SEQ ID NO: 4           moltype = AA  length = 7
FEATURE                Location/Qualifiers
VARIANT                2
                       note = Xaa is any amino acid
VARIANT                7
                       note = Xaa is any amino acid
source                 1..7
                       mol_type = protein
                       organism = Helicobacter pylori
SEQUENCE: 4
YXLKRHX                                                                          7

SEQ ID NO: 5           moltype = AA  length = 7
FEATURE                Location/Qualifiers
VARIANT                2
                       note = Xaa is any amino acid
VARIANT                7
                       note = Xaa is any amino acid
source                 1..7
                       mol_type = protein
                       organism = Helicobacter pylori
SEQUENCE: 5
IXLKRHX                                                                          7

SEQ ID NO: 6           moltype = AA  length = 7
FEATURE                Location/Qualifiers
VARIANT                2
                       note = Xaa is any amino acid
VARIANT                7
                       note = Xaa is any amino acid
source                 1..7
                       mol_type = protein
                       organism = Helicobacter pylori
SEQUENCE: 6
FXLRRYX                                                                          7

SEQ ID NO: 7           moltype = AA  length = 7
FEATURE                Location/Qualifiers
VARIANT                2
                       note = Xaa is any amio acid
VARIANT                7
                       note = Xaa is any amino acid
source                 1..7
                       mol_type = protein
                       organism = Helicobacter pylori
SEQUENCE: 7
FXLRRSX                                                                          7

SEQ ID NO: 8           moltype = AA  length = 5
FEATURE                Location/Qualifiers
source                 1..5
                       mol_type = protein
                       organism = Helicobacter pylori
SEQUENCE: 8
EPIYA                                                                            5

SEQ ID NO: 9           moltype = AA  length = 6
FEATURE                Location/Qualifiers
source                 1..6
                       mol_type = protein
                       organism = Helicobacter pylori
SEQUENCE: 9
EPIYAK                                                                           6

SEQ ID NO: 10          moltype = AA  length = 6
FEATURE                Location/Qualifiers
source                 1..6
                       mol_type = protein
                       organism = Helicobacter pylori
SEQUENCE: 10
EPIYAQ                                                                           6

SEQ ID NO: 11          moltype = AA  length = 5
FEATURE                Location/Qualifiers
source                 1..5
                       mol_type = protein
```

```
                                organism = Helicobacter pylori
SEQUENCE: 11
EPIYT                                                                            5

SEQ ID NO: 12          moltype = AA  length = 6
FEATURE                Location/Qualifiers
source                 1..6
                       mol_type = protein
                       organism = Helicobacter pylori
SEQUENCE: 12
EPIYAT                                                                           6

SEQ ID NO: 13          moltype = AA  length = 15
FEATURE                Location/Qualifiers
source                 1..15
                       mol_type = protein
                       organism = Helicobacter pylori
SEQUENCE: 13
IINQKVTDKV DNLNQ                                                                15

SEQ ID NO: 14          moltype = AA  length = 31
FEATURE                Location/Qualifiers
source                 1..31
                       mol_type = protein
                       organism = Helicobacter pylori
SEQUENCE: 14
NPTKKNQYFS DFIDKSNDLI NKDNLIDVES S                                              31

SEQ ID NO: 15          moltype = AA  length = 25
FEATURE                Location/Qualifiers
source                 1..25
                       mol_type = protein
                       organism = Helicobacter pylori
SEQUENCE: 15
DPSKINTRSI RNFMENIIQP PIPDD                                                     25

SEQ ID NO: 16          moltype = AA  length = 33
FEATURE                Location/Qualifiers
source                 1..33
                       mol_type = protein
                       organism = Helicobacter pylori
SEQUENCE: 16
KKQSSDVKEA INQEPVPHVQ PDIATTTTDI QGL                                            33

SEQ ID NO: 17          moltype = AA  length = 31
FEATURE                Location/Qualifiers
source                 1..31
                       mol_type = protein
                       organism = Helicobacter pylori
SEQUENCE: 17
PEARDLLDER GNFSKFTLGD MEMLDVEGVA D                                              31

SEQ ID NO: 18          moltype = AA  length = 22
FEATURE                Location/Qualifiers
source                 1..22
                       mol_type = protein
                       organism = Helicobacter pylori
SEQUENCE: 18
KAQANSQKDE IFALINKEAN RD                                                        22

SEQ ID NO: 19          moltype = AA  length = 24
FEATURE                Location/Qualifiers
source                 1..24
                       mol_type = protein
                       organism = Helicobacter pylori
SEQUENCE: 19
SKDLKDFSKS FDEFKNGKNK DFSK                                                      24

SEQ ID NO: 20          moltype = AA  length = 24
FEATURE                Location/Qualifiers
source                 1..24
                       mol_type = protein
                       organism = Helicobacter pylori
SEQUENCE: 20
GINPEWISKV ENLNAALNEF KNGK                                                      24

SEQ ID NO: 21          moltype = AA  length = 17
FEATURE                Location/Qualifiers
source                 1..17
```

```
                            mol_type = protein
                            organism = Helicobacter pylori
SEQUENCE: 21
INQKVTDKVD NLNQAVS                                                          17

SEQ ID NO: 22               moltype = AA   length = 20
FEATURE                     Location/Qualifiers
source                      1..20
                            mol_type = protein
                            organism = Helicobacter pylori
SEQUENCE: 22
FSDIKKELNE KFKNFNNNNN                                                       20

SEQ ID NO: 23               moltype = AA   length = 17
FEATURE                     Location/Qualifiers
source                      1..17
                            mol_type = protein
                            organism = Helicobacter pylori
SEQUENCE: 23
KNSTEPIYAK VNKKKTG                                                          17

SEQ ID NO: 24               moltype = AA   length = 20
FEATURE                     Location/Qualifiers
source                      1..20
                            mol_type = protein
                            organism = Helicobacter pylori
SEQUENCE: 24
YTQVAKKVNA KIDRLNQIAS                                                       20

SEQ ID NO: 25               moltype = AA   length = 17
FEATURE                     Location/Qualifiers
source                      1..17
                            mol_type = protein
                            organism = Helicobacter pylori
SEQUENCE: 25
AAGFPLKRHD KVDDLSK                                                          17

SEQ ID NO: 26               moltype = AA   length = 15
FEATURE                     Location/Qualifiers
source                      1..15
                            mol_type = protein
                            organism = Helicobacter pylori
SEQUENCE: 26
GLSASPEPIY ATIDD                                                            15

SEQ ID NO: 27               moltype = AA   length = 17
FEATURE                     Location/Qualifiers
source                      1..17
                            mol_type = protein
                            organism = Helicobacter pylori
SEQUENCE: 27
GGPFPLKRHD KVDDLSK                                                          17

SEQ ID NO: 28               moltype = AA   length = 17
FEATURE                     Location/Qualifiers
source                      1..17
                            mol_type = protein
                            organism = Helicobacter pylori
SEQUENCE: 28
VSEAKAGFFG NLEQTID                                                          17

SEQ ID NO: 29               moltype = AA   length = 18
FEATURE                     Location/Qualifiers
source                      1..18
                            mol_type = protein
                            organism = Helicobacter pylori
SEQUENCE: 29
ESAKKVPASL SAKLDNYA                                                         18

SEQ ID NO: 30               moltype = AA   length = 18
FEATURE                     Location/Qualifiers
source                      1..18
                            mol_type = protein
                            organism = Helicobacter pylori
SEQUENCE: 30
GAINEKATGM LTQKNPEW                                                         18

SEQ ID NO: 31               moltype = AA   length = 27
FEATURE                     Location/Qualifiers
```

| | | |
|---|---|---|
| source | 1..27<br>mol_type = protein<br>organism = Helicobacter pylori | |
| SEQUENCE: 31<br>SEYDKIGFNQ KNMKDYSDSF KFSTKLN | | 27 |
| SEQ ID NO: 32<br>FEATURE<br>source | moltype = AA  length = 15<br>Location/Qualifiers<br>1..15<br>mol_type = protein<br>organism = Helicobacter pylori | |
| SEQUENCE: 32<br>DVKEAINQEP VPHVQ | | 15 |
| SEQ ID NO: 33<br>FEATURE<br>source | moltype = AA  length = 15<br>Location/Qualifiers<br>1..15<br>mol_type = protein<br>organism = Helicobacter pylori | |
| SEQUENCE: 33<br>DVKEAINQEP LPHVQ | | 15 |
| SEQ ID NO: 34<br>FEATURE<br>source | moltype = AA  length = 15<br>Location/Qualifiers<br>1..15<br>mol_type = protein<br>organism = Helicobacter pylori | |
| SEQUENCE: 34<br>DVKEAINQEP VPHIQ | | 15 |
| SEQ ID NO: 35<br>FEATURE<br>source | moltype = AA  length = 15<br>Location/Qualifiers<br>1..15<br>mol_type = protein<br>organism = Helicobacter pylori | |
| SEQUENCE: 35<br>DVKEAINQEP VPNVQ | | 15 |
| SEQ ID NO: 36<br>FEATURE<br>source | moltype = AA  length = 15<br>Location/Qualifiers<br>1..15<br>mol_type = protein<br>organism = Helicobacter pylori | |
| SEQUENCE: 36<br>TTTHIQGLPP ESRDL | | 15 |
| SEQ ID NO: 37<br>FEATURE<br>source | moltype = AA  length = 15<br>Location/Qualifiers<br>1..15<br>mol_type = protein<br>organism = Helicobacter pylori | |
| SEQUENCE: 37<br>TTTPIQGLPP ESRDL | | 15 |
| SEQ ID NO: 38<br>FEATURE<br>source | moltype = AA  length = 15<br>Location/Qualifiers<br>1..15<br>mol_type = protein<br>organism = Helicobacter pylori | |
| SEQUENCE: 38<br>TPTHIQGLPP EARDL | | 15 |
| SEQ ID NO: 39<br>FEATURE<br>source | moltype = AA  length = 15<br>Location/Qualifiers<br>1..15<br>mol_type = protein<br>organism = Helicobacter pylori | |
| SEQUENCE: 39<br>QGLPPESRDL LDERG | | 15 |
| SEQ ID NO: 40<br>FEATURE<br>source | moltype = AA  length = 15<br>Location/Qualifiers<br>1..15<br>mol_type = protein<br>organism = Helicobacter pylori | |
| SEQUENCE: 40<br>QGLPPEARDL LDERG | | 15 |
| SEQ ID NO: 41 | moltype = AA  length = 15 | |

```
FEATURE                 Location/Qualifiers
source                  1..15
                        mol_type = protein
                        organism = Helicobacter pylori
SEQUENCE: 41
QSLPPEARDL LDERG                                                        15

SEQ ID NO: 42           moltype = AA  length = 15
FEATURE                 Location/Qualifiers
source                  1..15
                        mol_type = protein
                        organism = Helicobacter pylori
SEQUENCE: 42
QGLPLEARDL LDERG                                                        15

SEQ ID NO: 43           moltype = AA  length = 15
FEATURE                 Location/Qualifiers
source                  1..15
                        mol_type = protein
                        organism = Helicobacter pylori
SEQUENCE: 43
ESRDLLDERG NFSKF                                                        15

SEQ ID NO: 44           moltype = AA  length = 15
FEATURE                 Location/Qualifiers
source                  1..15
                        mol_type = protein
                        organism = Helicobacter pylori
SEQUENCE: 44
LDERGNFFKF TLGDM                                                        15

SEQ ID NO: 45           moltype = AA  length = 15
FEATURE                 Location/Qualifiers
source                  1..15
                        mol_type = protein
                        organism = Helicobacter pylori
SEQUENCE: 45
NFSKFTLGDM EMLDV                                                        15

SEQ ID NO: 46           moltype = AA  length = 15
FEATURE                 Location/Qualifiers
source                  1..15
                        mol_type = protein
                        organism = Helicobacter pylori
SEQUENCE: 46
NFFKFTLGDV EMLDV                                                        15

SEQ ID NO: 47           moltype = AA  length = 15
FEATURE                 Location/Qualifiers
source                  1..15
                        mol_type = protein
                        organism = Helicobacter pylori
SEQUENCE: 47
NFSKFTLGDM NMLDV                                                        15

SEQ ID NO: 48           moltype = AA  length = 15
FEATURE                 Location/Qualifiers
source                  1..15
                        mol_type = protein
                        organism = Helicobacter pylori
SEQUENCE: 48
DFSKFTLGDM EMLDV                                                        15

SEQ ID NO: 49           moltype = AA  length = 15
FEATURE                 Location/Qualifiers
source                  1..15
                        mol_type = protein
                        organism = Helicobacter pylori
SEQUENCE: 49
NFFKFTLGDM EMLDV                                                        15

SEQ ID NO: 50           moltype = AA  length = 15
FEATURE                 Location/Qualifiers
source                  1..15
                        mol_type = protein
                        organism = Helicobacter pylori
SEQUENCE: 50
NFPKFTLGDM EMLDV                                                        15
```

-continued

```
SEQ ID NO: 51          moltype = AA   length = 15
FEATURE                Location/Qualifiers
source                 1..15
                       mol_type = protein
                       organism = Helicobacter pylori
SEQUENCE: 51
NFSKFTLGDV EMLDV                                                    15

SEQ ID NO: 52          moltype = AA   length = 15
FEATURE                Location/Qualifiers
source                 1..15
                       mol_type = protein
                       organism = Helicobacter pylori
SEQUENCE: 52
IKDVIINQEI TDKVD                                                    15

SEQ ID NO: 53          moltype = AA   length = 15
FEATURE                Location/Qualifiers
source                 1..15
                       mol_type = protein
                       organism = Helicobacter pylori
SEQUENCE: 53
IINQKITDKV DNLNQ                                                    15

SEQ ID NO: 54          moltype = AA   length = 15
FEATURE                Location/Qualifiers
source                 1..15
                       mol_type = protein
                       organism = Helicobacter pylori
SEQUENCE: 54
IINQKVTDKV DNLNQ                                                    15

SEQ ID NO: 55          moltype = AA   length = 15
FEATURE                Location/Qualifiers
source                 1..15
                       mol_type = protein
                       organism = Helicobacter pylori
SEQUENCE: 55
IINQKITDKV DDLNQ                                                    15

SEQ ID NO: 56          moltype = AA   length = 15
FEATURE                Location/Qualifiers
source                 1..15
                       mol_type = protein
                       organism = Helicobacter pylori
SEQUENCE: 56
IINQKITDKV DNLSQ                                                    15

SEQ ID NO: 57          moltype = AA   length = 15
FEATURE                Location/Qualifiers
source                 1..15
                       mol_type = protein
                       organism = Helicobacter pylori
SEQUENCE: 57
IINQKITDKV DNLSS                                                    15

SEQ ID NO: 58          moltype = AA   length = 15
FEATURE                Location/Qualifiers
source                 1..15
                       mol_type = protein
                       organism = Helicobacter pylori
SEQUENCE: 58
IINQKVTDKV DDLNQ                                                    15

SEQ ID NO: 59          moltype = AA   length = 15
FEATURE                Location/Qualifiers
source                 1..15
                       mol_type = protein
                       organism = Helicobacter pylori
SEQUENCE: 59
IINQEITDKV DNLNQ                                                    15

SEQ ID NO: 60          moltype = AA   length = 15
FEATURE                Location/Qualifiers
source                 1..15
                       mol_type = protein
                       organism = Helicobacter pylori
SEQUENCE: 60
IINQKITDKA DNLNQ                                                    15
```

```
SEQ ID NO: 61          moltype = AA  length = 15
FEATURE                Location/Qualifiers
source                 1..15
                       mol_type = protein
                       organism = Helicobacter pylori
SEQUENCE: 61
IINQKVTDKV DNLSS                                                         15

SEQ ID NO: 62          moltype = AA  length = 15
FEATURE                Location/Qualifiers
source                 1..15
                       mol_type = protein
                       organism = Helicobacter pylori
SEQUENCE: 62
IINQKITDKV DSLNQ                                                         15

SEQ ID NO: 63          moltype = AA  length = 15
FEATURE                Location/Qualifiers
source                 1..15
                       mol_type = protein
                       organism = Helicobacter pylori
SEQUENCE: 63
IINQKITDKV ENLNQ                                                         15

SEQ ID NO: 64          moltype = AA  length = 15
FEATURE                Location/Qualifiers
source                 1..15
                       mol_type = protein
                       organism = Helicobacter pylori
SEQUENCE: 64
HINQQITDKV DNLNQ                                                         15

SEQ ID NO: 65          moltype = AA  length = 15
FEATURE                Location/Qualifiers
source                 1..15
                       mol_type = protein
                       organism = Helicobacter pylori
SEQUENCE: 65
IFNQKITDKV DDLNQ                                                         15

SEQ ID NO: 66          moltype = AA  length = 15
FEATURE                Location/Qualifiers
source                 1..15
                       mol_type = protein
                       organism = Helicobacter pylori
SEQUENCE: 66
ITDKVDNLNQ AVSIA                                                         15

SEQ ID NO: 67          moltype = AA  length = 15
FEATURE                Location/Qualifiers
source                 1..15
                       mol_type = protein
                       organism = Helicobacter pylori
SEQUENCE: 67
ITDKVDNLNQ AVSEA                                                         15

SEQ ID NO: 68          moltype = AA  length = 15
FEATURE                Location/Qualifiers
source                 1..15
                       mol_type = protein
                       organism = Helicobacter pylori
SEQUENCE: 68
TLAKNFSDIK KELNE                                                         15

SEQ ID NO: 69          moltype = AA  length = 15
FEATURE                Location/Qualifiers
source                 1..15
                       mol_type = protein
                       organism = Helicobacter pylori
SEQUENCE: 69
TLSKNFSDIK KELNE                                                         15

SEQ ID NO: 70          moltype = AA  length = 15
FEATURE                Location/Qualifiers
source                 1..15
                       mol_type = protein
                       organism = Helicobacter pylori
SEQUENCE: 70
```

NLAKNFSDIK KELNE                                                                15

SEQ ID NO: 71           moltype = AA  length = 15
FEATURE                 Location/Qualifiers
source                  1..15
                        mol_type = protein
                        organism = Helicobacter pylori SEQUENCE: 71
NFSDIKKELN EKFKN                                                                15

SEQ ID NO: 72           moltype = AA  length = 15
FEATURE                 Location/Qualifiers
source                  1..15
                        mol_type = protein
                        organism = Helicobacter pylori SEQUENCE: 72
NFSDIKKELN EKLFG                                                                15

SEQ ID NO: 73           moltype = AA  length = 15
FEATURE                 Location/Qualifiers
source                  1..15
                        mol_type = protein
                        organism = Helicobacter pylori SEQUENCE: 73
KNSTEPIYAK VNKKK                                                                15

SEQ ID NO: 74           moltype = AA  length = 15
FEATURE                 Location/Qualifiers
source                  1..15
                        mol_type = protein
                        organism = Helicobacter pylori SEQUENCE: 74
GLKNEPIYAK VNKKK                                                                15

SEQ ID NO: 75           moltype = AA  length = 15
FEATURE                 Location/Qualifiers
source                  1..15
                        mol_type = protein
                        organism = Helicobacter pylori SEQUENCE: 75
KNNTEPIYAQ VNKKK                                                                15

SEQ ID NO: 76           moltype = AA  length = 15
FEATURE                 Location/Qualifiers
source                  1..15
                        mol_type = protein
                        organism = Helicobacter pylori SEQUENCE: 76
KNSGEPIYAQ VNKKK                                                                15

SEQ ID NO: 77           moltype = AA  length = 15
FEATURE                 Location/Qualifiers
source                  1..15
                        mol_type = protein
                        organism = Helicobacter pylori SEQUENCE: 77
KGPEEPIYAK VNKKK                                                                15

SEQ ID NO: 78           moltype = AA  length = 15
FEATURE                 Location/Qualifiers
source                  1..15
                        mol_type = protein
                        organism = Helicobacter pylori SEQUENCE: 78
KNSAEPIYAQ VNKKK                                                                15

SEQ ID NO: 79           moltype = AA  length = 15
FEATURE                 Location/Qualifiers
source                  1..15
                        mol_type = protein
                        organism = Helicobacter pylori SEQUENCE: 79
KNSGEPIYAK VNKKK                                                                15

SEQ ID NO: 80           moltype = AA  length = 15
FEATURE                 Location/Qualifiers
source                  1..15
                        mol_type = protein
                        organism = Helicobacter pylori -continued

```
SEQUENCE: 80
KNSAEPIYAK VNKKK                                                           15

SEQ ID NO: 81           moltype = AA  length = 15
FEATURE                 Location/Qualifiers
source                  1..15
                        mol_type = protein
                        organism = Helicobacter pylori
SEQUENCE: 81
ENSTEPIYAK VNKKK                                                           15

SEQ ID NO: 82           moltype = AA  length = 15
FEATURE                 Location/Qualifiers
source                  1..15
                        mol_type = protein
                        organism = Helicobacter pylori
SEQUENCE: 82
KNNEEPIYAQ VNKKK                                                           15

SEQ ID NO: 83           moltype = AA  length = 15
FEATURE                 Location/Qualifiers
source                  1..15
                        mol_type = protein
                        organism = Helicobacter pylori
SEQUENCE: 83
KNNTEPIYAK VNKKK                                                           15

SEQ ID NO: 84           moltype = AA  length = 15
FEATURE                 Location/Qualifiers
source                  1..15
                        mol_type = protein
                        organism = Helicobacter pylori
SEQUENCE: 84
EPIYAKVNKK KTGQV                                                           15

SEQ ID NO: 85           moltype = AA  length = 15
FEATURE                 Location/Qualifiers
source                  1..15
                        mol_type = protein
                        organism = Helicobacter pylori
SEQUENCE: 85
EPIYAQVNKK KTGQV                                                           15

SEQ ID NO: 86           moltype = AA  length = 15
FEATURE                 Location/Qualifiers
source                  1..15
                        mol_type = protein
                        organism = Helicobacter pylori
SEQUENCE: 86
EPIYAKVNKK KAGQA                                                           15

SEQ ID NO: 87           moltype = AA  length = 15
FEATURE                 Location/Qualifiers
source                  1..15
                        mol_type = protein
                        organism = Helicobacter pylori
SEQUENCE: 87
EPIYAKVNKK KTGQA                                                           15

SEQ ID NO: 88           moltype = AA  length = 15
FEATURE                 Location/Qualifiers
source                  1..15
                        mol_type = protein
                        organism = Helicobacter pylori
SEQUENCE: 88
EPIYAKVNKK KAGQV                                                           15

SEQ ID NO: 89           moltype = AA  length = 15
FEATURE                 Location/Qualifiers
source                  1..15
                        mol_type = protein
                        organism = Helicobacter pylori
SEQUENCE: 89
EPIYAQVNKK KTGQA                                                           15

SEQ ID NO: 90           moltype = AA  length = 15
FEATURE                 Location/Qualifiers
source                  1..15
                        mol_type = protein
```

```
                                    organism = Helicobacter pylori
SEQUENCE: 90
EPIYAQVNKK KAGQA                                                        15

SEQ ID NO: 91              moltype = AA  length = 15
FEATURE                    Location/Qualifiers
source                     1..15
                           mol_type = protein
                           organism = Helicobacter pylori
SEQUENCE: 91
EPIYAQVNKK KAGQV                                                        15

SEQ ID NO: 92              moltype = AA  length = 15
FEATURE                    Location/Qualifiers
source                     1..15
                           mol_type = protein
                           organism = Helicobacter pylori
SEQUENCE: 92
EPIYAKVNKK KTGEV                                                        15

SEQ ID NO: 93              moltype = AA  length = 15
FEATURE                    Location/Qualifiers
source                     1..15
                           mol_type = protein
                           organism = Helicobacter pylori
SEQUENCE: 93
EPIYAKVNKK KTEQA                                                        15

SEQ ID NO: 94              moltype = AA  length = 15
FEATURE                    Location/Qualifiers
source                     1..15
                           mol_type = protein
                           organism = Helicobacter pylori
SEQUENCE: 94
VASPEEPIYA QVAKK                                                        15

SEQ ID NO: 95              moltype = AA  length = 15
FEATURE                    Location/Qualifiers
source                     1..15
                           mol_type = protein
                           organism = Helicobacter pylori
SEQUENCE: 95
VASPEEPIYT QVAKK                                                        15

SEQ ID NO: 96              moltype = AA  length = 15
FEATURE                    Location/Qualifiers
source                     1..15
                           mol_type = protein
                           organism = Helicobacter pylori
SEQUENCE: 96
AASPEEPIYA QVAKK                                                        15

SEQ ID NO: 97              moltype = AA  length = 15
FEATURE                    Location/Qualifiers
source                     1..15
                           mol_type = protein
                           organism = Helicobacter pylori
SEQUENCE: 97
ATSPEEPIYA QVAKK                                                        15

SEQ ID NO: 98              moltype = AA  length = 15
FEATURE                    Location/Qualifiers
source                     1..15
                           mol_type = protein
                           organism = Helicobacter pylori
SEQUENCE: 98
AASLEEPIYA QVAKK                                                        15

SEQ ID NO: 99              moltype = AA  length = 15
FEATURE                    Location/Qualifiers
source                     1..15
                           mol_type = protein
                           organism = Helicobacter pylori
SEQUENCE: 99
AASPEEPIYT QVAKK                                                        15

SEQ ID NO: 100             moltype = AA  length = 15
FEATURE                    Location/Qualifiers
source                     1..15
```

```
SEQUENCE: 100
AASHEEPIYA QVAKK                                              15

SEQ ID NO: 101          moltype = AA  length = 15
FEATURE                 Location/Qualifiers
source                  1..15
                        mol_type = protein
                        organism = Helicobacter pylori
SEQUENCE: 101
VASLEEPIYT QVAKK                                              15

SEQ ID NO: 102          moltype = AA  length = 15
FEATURE                 Location/Qualifiers
source                  1..15
                        mol_type = protein
                        organism = Helicobacter pylori
SEQUENCE: 102
LENSTEPIYT QVAKK                                              15

SEQ ID NO: 103          moltype = AA  length = 15
FEATURE                 Location/Qualifiers
source                  1..15
                        mol_type = protein
                        organism = Helicobacter pylori
SEQUENCE: 103
ASPEEPVYTQ VAKMV                                              15

SEQ ID NO: 104          moltype = AA  length = 15
FEATURE                 Location/Qualifiers
source                  1..15
                        mol_type = protein
                        organism = Helicobacter pylori
SEQUENCE: 104
VASHEEPIYA QVAKK                                              15

SEQ ID NO: 105          moltype = AA  length = 15
FEATURE                 Location/Qualifiers
source                  1..15
                        mol_type = protein
                        organism = Helicobacter pylori
SEQUENCE: 105
EEPIYAQVAK KVNAK                                              15

SEQ ID NO: 106          moltype = AA  length = 15
FEATURE                 Location/Qualifiers
source                  1..15
                        mol_type = protein
                        organism = Helicobacter pylori
SEQUENCE: 106
EEPIYTQVAK KVNAK                                              15

SEQ ID NO: 107          moltype = AA  length = 15
FEATURE                 Location/Qualifiers
source                  1..15
                        mol_type = protein
                        organism = Helicobacter pylori
SEQUENCE: 107
EEPIYAQVAK KVSAK                                              15

SEQ ID NO: 108          moltype = AA  length = 15
FEATURE                 Location/Qualifiers
source                  1..15
                        mol_type = protein
                        organism = Helicobacter pylori
SEQUENCE: 108
EEPIYAQVAK KVTQK                                              15

SEQ ID NO: 109          moltype = AA  length = 15
FEATURE                 Location/Qualifiers
source                  1..15
                        mol_type = protein
                        organism = Helicobacter pylori
SEQUENCE: 109
EEPIYAQVAK KVTKK                                              15

SEQ ID NO: 110          moltype = AA  length = 15
FEATURE                 Location/Qualifiers
```

```
source                    1..15
                          mol_type = protein
                          organism = Helicobacter pylori
SEQUENCE: 110
EEPIYTQVAK KVTKK                                                              15

SEQ ID NO: 111            moltype = AA   length = 15
FEATURE                   Location/Qualifiers
source                    1..15
                          mol_type = protein
                          organism = Helicobacter pylori
SEQUENCE: 111
EEPIYTQVAK KVKAK                                                              15

SEQ ID NO: 112            moltype = AA   length = 15
FEATURE                   Location/Qualifiers
source                    1..15
                          mol_type = protein
                          organism = Helicobacter pylori
SEQUENCE: 112
EEPIYTQVAK KVTQK                                                              15

SEQ ID NO: 113            moltype = AA   length = 15
FEATURE                   Location/Qualifiers
source                    1..15
                          mol_type = protein
                          organism = Helicobacter pylori
SEQUENCE: 113
TEPIYTQVAK KVKAK                                                              15

SEQ ID NO: 114            moltype = AA   length = 15
FEATURE                   Location/Qualifiers
source                    1..15
                          mol_type = protein
                          organism = Helicobacter pylori
SEQUENCE: 114
EEPVYTQVAK MVTQK                                                              15

SEQ ID NO: 115            moltype = AA   length = 15
FEATURE                   Location/Qualifiers
source                    1..15
                          mol_type = protein
                          organism = Helicobacter pylori
SEQUENCE: 115
AQVAKKVNAK IDRLN                                                              15

SEQ ID NO: 116            moltype = AA   length = 15
FEATURE                   Location/Qualifiers
source                    1..15
                          mol_type = protein
                          organism = Helicobacter pylori
SEQUENCE: 116
AQVAKKVSAK IDQLN                                                              15

SEQ ID NO: 117            moltype = AA   length = 15
FEATURE                   Location/Qualifiers
source                    1..15
                          mol_type = protein
                          organism = Helicobacter pylori
SEQUENCE: 117
TQVAKKVNAK IDRLN                                                              15

SEQ ID NO: 118            moltype = AA   length = 15
FEATURE                   Location/Qualifiers
source                    1..15
                          mol_type = protein
                          organism = Helicobacter pylori
SEQUENCE: 118
AQVAKKVNAK IDQLN                                                              15

SEQ ID NO: 119            moltype = AA   length = 15
FEATURE                   Location/Qualifiers
source                    1..15
                          mol_type = protein
                          organism = Helicobacter pylori
SEQUENCE: 119
TQVAKKVNAK IDQLN                                                              15

SEQ ID NO: 120            moltype = AA   length = 15
```

```
FEATURE                 Location/Qualifiers
source                  1..15
                        mol_type = protein
                        organism = Helicobacter pylori
SEQUENCE: 120
TQVAKKVKAK IDQLN                                                          15

SEQ ID NO: 121          moltype = AA   length = 15
FEATURE                 Location/Qualifiers
source                  1..15
                        mol_type = protein
                        organism = Helicobacter pylori
SEQUENCE: 121
TQVAKKVTQK IDQLN                                                          15

SEQ ID NO: 122          moltype = AA   length = 15
FEATURE                 Location/Qualifiers
source                  1..15
                        mol_type = protein
                        organism = Helicobacter pylori
SEQUENCE: 122
KKVNAKIDRL NQIAS                                                          15

SEQ ID NO: 123          moltype = AA   length = 15
FEATURE                 Location/Qualifiers
source                  1..15
                        mol_type = protein
                        organism = Helicobacter pylori
SEQUENCE: 123
KKVNAKIDQL NQAAS                                                          15

SEQ ID NO: 124          moltype = AA   length = 15
FEATURE                 Location/Qualifiers
source                  1..15
                        mol_type = protein
                        organism = Helicobacter pylori
SEQUENCE: 124
KKVNAKIDQL NQIAS                                                          15

SEQ ID NO: 125          moltype = AA   length = 15
FEATURE                 Location/Qualifiers
source                  1..15
                        mol_type = protein
                        organism = Helicobacter pylori
SEQUENCE: 125
KKVNAKIDRL NQAAS                                                          15

SEQ ID NO: 126          moltype = AA   length = 15
FEATURE                 Location/Qualifiers
source                  1..15
                        mol_type = protein
                        organism = Helicobacter pylori
SEQUENCE: 126
KKVKAKIDQL NQAAS                                                          15

SEQ ID NO: 127          moltype = AA   length = 15
FEATURE                 Location/Qualifiers
source                  1..15
                        mol_type = protein
                        organism = Helicobacter pylori
SEQUENCE: 127
KKVNAKIDRL NQIAR                                                          15

SEQ ID NO: 128          moltype = AA   length = 15
FEATURE                 Location/Qualifiers
source                  1..15
                        mol_type = protein
                        organism = Helicobacter pylori
SEQUENCE: 128
KKVSAKIDQL NQAAS                                                          15

SEQ ID NO: 129          moltype = AA   length = 15
FEATURE                 Location/Qualifiers
source                  1..15
                        mol_type = protein
                        organism = Helicobacter pylori
SEQUENCE: 129
GVGQAAGFPL KRHDK                                                          15
```

```
SEQ ID NO: 130           moltype = AA   length = 15
FEATURE                  Location/Qualifiers
source                   1..15
                         mol_type = protein
                         organism = Helicobacter pylori
SEQUENCE: 130
GVGQAAGFPL KKHDK                                                          15

SEQ ID NO: 131           moltype = AA   length = 15
FEATURE                  Location/Qualifiers
source                   1..15
                         mol_type = protein
                         organism = Helicobacter pylori
SEQUENCE: 131
GVGQAAGFPL KKHGK                                                          15

SEQ ID NO: 132           moltype = AA   length = 15
FEATURE                  Location/Qualifiers
source                   1..15
                         mol_type = protein
                         organism = Helicobacter pylori
SEQUENCE: 132
GVGQAASFPL KRHDK                                                          15

SEQ ID NO: 133           moltype = AA   length = 15
FEATURE                  Location/Qualifiers
source                   1..15
                         mol_type = protein
                         organism = Helicobacter pylori
SEQUENCE: 133
GVGRAAGFPL KRHDK                                                          15

SEQ ID NO: 134           moltype = AA   length = 15
FEATURE                  Location/Qualifiers
source                   1..15
                         mol_type = protein
                         organism = Helicobacter pylori
SEQUENCE: 134
GVGQAVGFPL KRHDK                                                          15

SEQ ID NO: 135           moltype = AA   length = 15
FEATURE                  Location/Qualifiers
source                   1..15
                         mol_type = protein
                         organism = Helicobacter pylori
SEQUENCE: 135
GVGKAAGFPL KRHDK                                                          15

SEQ ID NO: 136           moltype = AA   length = 15
FEATURE                  Location/Qualifiers
source                   1..15
                         mol_type = protein
                         organism = Helicobacter pylori
SEQUENCE: 136
DVGQAANFLL KRHDK                                                          15

SEQ ID NO: 137           moltype = AA   length = 15
FEATURE                  Location/Qualifiers
source                   1..15
                         mol_type = protein
                         organism = Helicobacter pylori
SEQUENCE: 137
VVGQAVGFPL KRHDK                                                          15

SEQ ID NO: 138           moltype = AA   length = 15
FEATURE                  Location/Qualifiers
source                   1..15
                         mol_type = protein
                         organism = Helicobacter pylori
SEQUENCE: 138
GVGQAAGYPL KRHDK                                                          15

SEQ ID NO: 139           moltype = AA   length = 15
FEATURE                  Location/Qualifiers
source                   1..15
                         mol_type = protein
                         organism = Helicobacter pylori
SEQUENCE: 139
GVGQATGFPL KRHDK                                                          15
```

```
SEQ ID NO: 140          moltype = AA   length = 15
FEATURE                 Location/Qualifiers
source                  1..15
                        mol_type = protein
                        organism = Helicobacter pylori
SEQUENCE: 140
GVGQVAGFPL KKHGK                                                        15

SEQ ID NO: 141          moltype = AA   length = 15
FEATURE                 Location/Qualifiers
source                  1..15
                        mol_type = protein
                        organism = Helicobacter pylori
SEQUENCE: 141
VGQAGFPLKR HDKVD                                                        15

SEQ ID NO: 142          moltype = AA   length = 15
FEATURE                 Location/Qualifiers
source                  1..15
                        mol_type = protein
                        organism = Helicobacter pylori
SEQUENCE: 142
VGQAGFPLKR HDKVE                                                        15

SEQ ID NO: 143          moltype = AA   length = 15
FEATURE                 Location/Qualifiers
source                  1..15
                        mol_type = protein
                        organism = Helicobacter pylori
SEQUENCE: 143
VGQAGFPLKK HAKVE                                                        15

SEQ ID NO: 144          moltype = AA   length = 15
FEATURE                 Location/Qualifiers
source                  1..15
                        mol_type = protein
                        organism = Helicobacter pylori
SEQUENCE: 144
VNQAGFPLKR HDKVD                                                        15

SEQ ID NO: 145          moltype = AA   length = 15
FEATURE                 Location/Qualifiers
source                  1..15
                        mol_type = protein
                        organism = Helicobacter pylori
SEQUENCE: 145
VGQAGFLLKR HDKVD                                                        15

SEQ ID NO: 146          moltype = AA   length = 15
FEATURE                 Location/Qualifiers
source                  1..15
                        mol_type = protein
                        organism = Helicobacter pylori
SEQUENCE: 146
AGFPLKRHDK VDDLS                                                        15

SEQ ID NO: 147          moltype = AA   length = 15
FEATURE                 Location/Qualifiers
source                  1..15
                        mol_type = protein
                        organism = Helicobacter pylori
SEQUENCE: 147
GPFPLKRHDK VDDLS                                                        15

SEQ ID NO: 148          moltype = AA   length = 15
FEATURE                 Location/Qualifiers
source                  1..15
                        mol_type = protein
                        organism = Helicobacter pylori
SEQUENCE: 148
AGFPLKRHDK VEDLS                                                        15

SEQ ID NO: 149          moltype = AA   length = 15
FEATURE                 Location/Qualifiers
source                  1..15
                        mol_type = protein
                        organism = Helicobacter pylori
SEQUENCE: 149
```

AGFPLKKHDK VDDLS                                                              15

SEQ ID NO: 150          moltype = AA  length = 15
FEATURE                 Location/Qualifiers
source                  1..15
                        mol_type = protein
                        organism = Helicobacter pylori SEQUENCE: 150
AGFPLKKHAK VEDLS                                                              15

SEQ ID NO: 151          moltype = AA  length = 15
FEATURE                 Location/Qualifiers
source                  1..15
                        mol_type = protein
                        organism = Helicobacter pylori SEQUENCE: 151
AGFPLKKHDK VEDLS                                                              15

SEQ ID NO: 152          moltype = AA  length = 15
FEATURE                 Location/Qualifiers
source                  1..15
                        mol_type = protein
                        organism = Helicobacter pylori SEQUENCE: 152
ASFPLKRHDK VDDLS                                                              15

SEQ ID NO: 153          moltype = AA  length = 15
FEATURE                 Location/Qualifiers
source                  1..15
                        mol_type = protein
                        organism = Helicobacter pylori SEQUENCE: 153
EGFPLKRHDK VDDLS                                                              15

SEQ ID NO: 154          moltype = AA  length = 15
FEATURE                 Location/Qualifiers
source                  1..15
                        mol_type = protein
                        organism = Helicobacter pylori SEQUENCE: 154
AGFPLKKHGK VDDLS                                                              15

SEQ ID NO: 155          moltype = AA  length = 15
FEATURE                 Location/Qualifiers
source                  1..15
                        mol_type = protein
                        organism = Helicobacter pylori SEQUENCE: 155
AGFPLKRHDK VGDLS                                                              15

SEQ ID NO: 156          moltype = AA  length = 15
FEATURE                 Location/Qualifiers
source                  1..15
                        mol_type = protein
                        organism = Helicobacter pylori SEQUENCE: 156
GSFPLKRHDK VEDLS                                                              15

SEQ ID NO: 157          moltype = AA  length = 15
FEATURE                 Location/Qualifiers
source                  1..15
                        mol_type = protein
                        organism = Helicobacter pylori SEQUENCE: 157
AGYPLKRHDK VDDLS                                                              15

SEQ ID NO: 158          moltype = AA  length = 15
FEATURE                 Location/Qualifiers
source                  1..15
                        mol_type = protein
                        organism = Helicobacter pylori SEQUENCE: 158
GSSPLKRHAK VDDLS                                                              15

SEQ ID NO: 159          moltype = AA  length = 15
FEATURE                 Location/Qualifiers
source                  1..15
                        mol_type = protein
                        organism = Helicobacter pylori

```
SEQUENCE: 159
TGFPLKRHDK VDDLS                                                          15

SEQ ID NO: 160          moltype = AA  length = 15
FEATURE                 Location/Qualifiers
source                  1..15
                        mol_type = protein
                        organism = Helicobacter pylori
SEQUENCE: 160
GPFPLKKHAK VDDLS                                                          15

SEQ ID NO: 161          moltype = AA  length = 15
FEATURE                 Location/Qualifiers
source                  1..15
                        mol_type = protein
                        organism = Helicobacter pylori
SEQUENCE: 161
LKRHDKVDDL SKVGL                                                          15

SEQ ID NO: 162          moltype = AA  length = 15
FEATURE                 Location/Qualifiers
source                  1..15
                        mol_type = protein
                        organism = Helicobacter pylori
SEQUENCE: 162
LKRHDKVDDL SKVGR                                                          15

SEQ ID NO: 163          moltype = AA  length = 15
FEATURE                 Location/Qualifiers
source                  1..15
                        mol_type = protein
                        organism = Helicobacter pylori
SEQUENCE: 163
LKRHDKVEDL SKVGR                                                          15

SEQ ID NO: 164          moltype = AA  length = 15
FEATURE                 Location/Qualifiers
source                  1..15
                        mol_type = protein
                        organism = Helicobacter pylori
SEQUENCE: 164
LKRHDKVEDL SKVGL                                                          15

SEQ ID NO: 165          moltype = AA  length = 15
FEATURE                 Location/Qualifiers
source                  1..15
                        mol_type = protein
                        organism = Helicobacter pylori
SEQUENCE: 165
LKRHDKVGDL SKVGL                                                          15

SEQ ID NO: 166          moltype = AA  length = 15
FEATURE                 Location/Qualifiers
source                  1..15
                        mol_type = protein
                        organism = Helicobacter pylori
SEQUENCE: 166
LKKHDKVEDL SKVGR                                                          15

SEQ ID NO: 167          moltype = AA  length = 15
FEATURE                 Location/Qualifiers
source                  1..15
                        mol_type = protein
                        organism = Helicobacter pylori
SEQUENCE: 167
LKKHDKVDDL SKVGR                                                          15

SEQ ID NO: 168          moltype = AA  length = 15
FEATURE                 Location/Qualifiers
source                  1..15
                        mol_type = protein
                        organism = Helicobacter pylori
SEQUENCE: 168
LKRHAKVDDL SKVGL                                                          15

SEQ ID NO: 169          moltype = AA  length = 15
FEATURE                 Location/Qualifiers
source                  1..15
                        mol_type = protein
```

```
                          organism = Helicobacter pylori
SEQUENCE: 169
LKKHDKVDDL SKVGL                                                         15

SEQ ID NO: 170         moltype = AA  length = 15
FEATURE                Location/Qualifiers
source                 1..15
                       mol_type = protein
                       organism = Helicobacter pylori
SEQUENCE: 170
LKKHGKVDDL SKVGL                                                         15

SEQ ID NO: 171         moltype = AA  length = 15
FEATURE                Location/Qualifiers
source                 1..15
                       mol_type = protein
                       organism = Helicobacter pylori
SEQUENCE: 171
RSVSPEPIYA TIDDL                                                         15

SEQ ID NO: 172         moltype = AA  length = 15
FEATURE                Location/Qualifiers
source                 1..15
                       mol_type = protein
                       organism = Helicobacter pylori
SEQUENCE: 172
LSASPEPIYA TIDDL                                                         15

SEQ ID NO: 173         moltype = AA  length = 15
FEATURE                Location/Qualifiers
source                 1..15
                       mol_type = protein
                       organism = Helicobacter pylori
SEQUENCE: 173
SASPEPIYAT IDFDE                                                         15

SEQ ID NO: 174         moltype = AA  length = 15
FEATURE                Location/Qualifiers
source                 1..15
                       mol_type = protein
                       organism = Helicobacter pylori
SEQUENCE: 174
LSANPEPIYA TIDDL                                                         15

SEQ ID NO: 175         moltype = AA  length = 15
FEATURE                Location/Qualifiers
source                 1..15
                       mol_type = protein
                       organism = Helicobacter pylori
SEQUENCE: 175
RLDSPEPIYA TIDDL                                                         15

SEQ ID NO: 176         moltype = AA  length = 15
FEATURE                Location/Qualifiers
source                 1..15
                       mol_type = protein
                       organism = Helicobacter pylori
SEQUENCE: 176
LSANHEPIYA TIDDL                                                         15

SEQ ID NO: 177         moltype = AA  length = 15
FEATURE                Location/Qualifiers
source                 1..15
                       mol_type = protein
                       organism = Helicobacter pylori
SEQUENCE: 177
NSDRSEPIYA TIDDL                                                         15

SEQ ID NO: 178         moltype = AA  length = 15
FEATURE                Location/Qualifiers
source                 1..15
                       mol_type = protein
                       organism = Helicobacter pylori
SEQUENCE: 178
LSASPEPIYA TIDEL                                                         15

SEQ ID NO: 179         moltype = AA  length = 15
FEATURE                Location/Qualifiers
source                 1..15
```

```
                        mol_type = protein
                        organism = Helicobacter pylori
SEQUENCE: 179
PEPIYATIDD LGGPF                                                   15

SEQ ID NO: 180          moltype = AA   length = 15
FEATURE                 Location/Qualifiers
source                  1..15
                        mol_type = protein
                        organism = Helicobacter pylori
SEQUENCE: 180
PEPIYATIDD LGGSF                                                   15

SEQ ID NO: 181          moltype = AA   length = 15
FEATURE                 Location/Qualifiers
source                  1..15
                        mol_type = protein
                        organism = Helicobacter pylori
SEQUENCE: 181
PEPIYATIDE LGGPF                                                   15

SEQ ID NO: 182          moltype = AA   length = 15
FEATURE                 Location/Qualifiers
source                  1..15
                        mol_type = protein
                        organism = Helicobacter pylori
SEQUENCE: 182
SEPIYATIDD LGGPF                                                   15

SEQ ID NO: 183          moltype = AA   length = 15
FEATURE                 Location/Qualifiers
source                  1..15
                        mol_type = protein
                        organism = Helicobacter pylori
SEQUENCE: 183
HEPIYATIDD LDGPF                                                   15

SEQ ID NO: 184          moltype = AA   length = 15
FEATURE                 Location/Qualifiers
source                  1..15
                        mol_type = protein
                        organism = Helicobacter pylori
SEQUENCE: 184
HEPIYATIDD LGGPF                                                   15

SEQ ID NO: 185          moltype = AA   length = 15
FEATURE                 Location/Qualifiers
source                  1..15
                        mol_type = protein
                        organism = Helicobacter pylori
SEQUENCE: 185
EPIYATIDDL DGSSP                                                   15

SEQ ID NO: 186          moltype = AA   length = 15
FEATURE                 Location/Qualifiers
source                  1..15
                        mol_type = protein
                        organism = Helicobacter pylori
SEQUENCE: 186
IDDLGGPFPL KRHDK                                                   15

SEQ ID NO: 187          moltype = AA   length = 15
FEATURE                 Location/Qualifiers
source                  1..15
                        mol_type = protein
                        organism = Helicobacter pylori
SEQUENCE: 187
RHDKVDDLSK VGRSV                                                   15

SEQ ID NO: 188          moltype = AA   length = 15
FEATURE                 Location/Qualifiers
source                  1..15
                        mol_type = protein
                        organism = Helicobacter pylori
SEQUENCE: 188
DLNQAVSEAK IGHFD                                                   15

SEQ ID NO: 189          moltype = AA   length = 15
FEATURE                 Location/Qualifiers
```

```
source                  1..15
                        mol_type = protein
                        organism = Helicobacter pylori
SEQUENCE: 189
NGAINEKATG MLTQK                                                          15

SEQ ID NO: 190          moltype = AA   length = 15
FEATURE                 Location/Qualifiers
source                  1..15
                        mol_type = protein
                        organism = Helicobacter pylori
SEQUENCE: 190
NGTINEKATG MLTQK                                                          15

SEQ ID NO: 191          moltype = AA   length = 15
FEATURE                 Location/Qualifiers
source                  1..15
                        mol_type = protein
                        organism = Helicobacter pylori
SEQUENCE: 191
SGTINEKATG MLTQK                                                          15

SEQ ID NO: 192          moltype = AA   length = 15
FEATURE                 Location/Qualifiers
source                  1..15
                        mol_type = protein
                        organism = Helicobacter pylori
SEQUENCE: 192
TGTINEKATG MLTQK                                                          15

SEQ ID NO: 193          moltype = AA   length = 15
FEATURE                 Location/Qualifiers
source                  1..15
                        mol_type = protein
                        organism = Helicobacter pylori
SEQUENCE: 193
EKATGMLTQK NPEWL                                                          15

SEQ ID NO: 194          moltype = AA   length = 15
FEATURE                 Location/Qualifiers
source                  1..15
                        mol_type = protein
                        organism = Helicobacter pylori
SEQUENCE: 194
EKVTGMLTQK NPEWL                                                          15

SEQ ID NO: 195          moltype = AA   length = 15
FEATURE                 Location/Qualifiers
source                  1..15
                        mol_type = protein
                        organism = Helicobacter pylori
SEQUENCE: 195
LSEYDKIGFN QKNMK                                                          15

SEQ ID NO: 196          moltype = AA   length = 15
FEATURE                 Location/Qualifiers
source                  1..15
                        mol_type = protein
                        organism = Helicobacter pylori
SEQUENCE: 196
LSAYDKIGFN QKNMK                                                          15

SEQ ID NO: 197          moltype = AA   length = 15
FEATURE                 Location/Qualifiers
source                  1..15
                        mol_type = protein
                        organism = Helicobacter pylori
SEQUENCE: 197
LSDYDKIGFN QKNMK                                                          15

SEQ ID NO: 198          moltype = AA   length = 15
FEATURE                 Location/Qualifiers
source                  1..15
                        mol_type = protein
                        organism = Helicobacter pylori
SEQUENCE: 198
LSEYDNIGFN QKNMK                                                          15

SEQ ID NO: 199          moltype = AA   length = 15
```

```
FEATURE              Location/Qualifiers
source               1..15
                     mol_type = protein
                     organism = Helicobacter pylori
SEQUENCE: 199
LLEYDKIGFN QKNMK                                                        15

SEQ ID NO: 200       moltype = AA   length = 15
FEATURE              Location/Qualifiers
source               1..15
                     mol_type = protein
                     organism = Helicobacter pylori
SEQUENCE: 200
LSEYDKIGFS QKNMK                                                        15

SEQ ID NO: 201       moltype = AA   length = 15
FEATURE              Location/Qualifiers
source               1..15
                     mol_type = protein
                     organism = Helicobacter pylori
SEQUENCE: 201
LSEYDKIGFN QKSMK                                                        15

SEQ ID NO: 202       moltype = AA   length = 15
FEATURE              Location/Qualifiers
source               1..15
                     mol_type = protein
                     organism = Helicobacter pylori
SEQUENCE: 202
LSDYDKIGFN QKDMK                                                        15

SEQ ID NO: 203       moltype = AA   length = 15
FEATURE              Location/Qualifiers
source               1..15
                     mol_type = protein
                     organism = Helicobacter pylori
SEQUENCE: 203
KDYSDSFKFS TKLNN                                                        15

SEQ ID NO: 204       moltype = AA   length = 15
FEATURE              Location/Qualifiers
source               1..15
                     mol_type = protein
                     organism = Helicobacter pylori
SEQUENCE: 204
KDYSDSFKFS TKLSN                                                        15

SEQ ID NO: 205       moltype = AA   length = 15
FEATURE              Location/Qualifiers
source               1..15
                     mol_type = protein
                     organism = Helicobacter pylori
SEQUENCE: 205
KDYSDSFKFS TKLND                                                        15

SEQ ID NO: 206       moltype = AA   length = 15
FEATURE              Location/Qualifiers
source               1..15
                     mol_type = protein
                     organism = Helicobacter pylori
SEQUENCE: 206
KDYSDSFKFS TRLNN                                                        15

SEQ ID NO: 207       moltype = AA   length = 15
FEATURE              Location/Qualifiers
source               1..15
                     mol_type = protein
                     organism = Helicobacter pylori
SEQUENCE: 207
KDYSDSFKFS IKLSN                                                        15

SEQ ID NO: 208       moltype = AA   length = 15
FEATURE              Location/Qualifiers
source               1..15
                     mol_type = protein
                     organism = Helicobacter pylori
SEQUENCE: 208
NKSNDLINKD ALIDV                                                        15
```

```
SEQ ID NO: 209         moltype = AA   length = 15
FEATURE                Location/Qualifiers
source                 1..15
                       mol_type = protein
                       organism = Helicobacter pylori
SEQUENCE: 209
TTTDIQGLPP ESRDL                                                    15

SEQ ID NO: 210         moltype = AA   length = 15
FEATURE                Location/Qualifiers
source                 1..15
                       mol_type = protein
                       organism = Helicobacter pylori
SEQUENCE: 210
STTHIQGLPP ESRDL                                                    15

SEQ ID NO: 211         moltype = AA   length = 15
FEATURE                Location/Qualifiers
source                 1..15
                       mol_type = protein
                       organism = Helicobacter pylori
SEQUENCE: 211
SFIFDKKQSS DVKEA                                                    15

SEQ ID NO: 212         moltype = AA   length = 15
FEATURE                Location/Qualifiers
source                 1..15
                       mol_type = protein
                       organism = Helicobacter pylori
SEQUENCE: 212
SFVFDKKQSS DLKET                                                    15

SEQ ID NO: 213         moltype = AA   length = 15
FEATURE                Location/Qualifiers
source                 1..15
                       mol_type = protein
                       organism = Helicobacter pylori
SEQUENCE: 213
SFAFDKKQSS DLKET                                                    15

SEQ ID NO: 214         moltype = AA   length = 15
FEATURE                Location/Qualifiers
source                 1..15
                       mol_type = protein
                       organism = Helicobacter pylori
SEQUENCE: 214
ESRDLLDERG NFFKF                                                    15

SEQ ID NO: 215         moltype = AA   length = 15
FEATURE                Location/Qualifiers
source                 1..15
                       mol_type = protein
                       organism = Helicobacter pylori
SEQUENCE: 215
EARDLLDERG DFSKF                                                    15

SEQ ID NO: 216         moltype = AA   length = 15
FEATURE                Location/Qualifiers
source                 1..15
                       mol_type = protein
                       organism = Helicobacter pylori
SEQUENCE: 216
EARDLLDERG NFFKF                                                    15

SEQ ID NO: 217         moltype = AA   length = 15
FEATURE                Location/Qualifiers
source                 1..15
                       mol_type = protein
                       organism = Helicobacter pylori
SEQUENCE: 217
LTPEARKLLE EAKKS                                                    15

SEQ ID NO: 218         moltype = AA   length = 15
FEATURE                Location/Qualifiers
source                 1..15
                       mol_type = protein
                       organism = Helicobacter pylori
SEQUENCE: 218
NSQKDEIFAL ISKEA                                                    15
```

```
SEQ ID NO: 219          moltype = AA  length = 15
FEATURE                 Location/Qualifiers
source                  1..15
                        mol_type = protein
                        organism = Helicobacter pylori
SEQUENCE: 219
NSQKDEIFAL INQET                                                    15

SEQ ID NO: 220          moltype = AA  length = 15
FEATURE                 Location/Qualifiers
source                  1..15
                        mol_type = protein
                        organism = Helicobacter pylori
SEQUENCE: 220
NSQKNEIFAL INKEA                                                    15

SEQ ID NO: 221          moltype = AA  length = 15
FEATURE                 Location/Qualifiers
source                  1..15
                        mol_type = protein
                        organism = Helicobacter pylori
SEQUENCE: 221
NSQKDEIFKL INEGA                                                    15

SEQ ID NO: 222          moltype = AA  length = 15
FEATURE                 Location/Qualifiers
source                  1..15
                        mol_type = protein
                        organism = Helicobacter pylori
SEQUENCE: 222
NSQKDEILAL INKEA                                                    15

SEQ ID NO: 223          moltype = AA  length = 15
FEATURE                 Location/Qualifiers
source                  1..15
                        mol_type = protein
                        organism = Helicobacter pylori
SEQUENCE: 223
VNKDLKDFSK SFDEF                                                    15

SEQ ID NO: 224          moltype = AA  length = 15
FEATURE                 Location/Qualifiers
source                  1..15
                        mol_type = protein
                        organism = Helicobacter pylori
SEQUENCE: 224
INKDLKDFSK SFDDF                                                    15

SEQ ID NO: 225          moltype = AA  length = 15
FEATURE                 Location/Qualifiers
source                  1..15
                        mol_type = protein
                        organism = Helicobacter pylori
SEQUENCE: 225
INKNLKDFSK SFDEF                                                    15

SEQ ID NO: 226          moltype = AA  length = 15
FEATURE                 Location/Qualifiers
source                  1..15
                        mol_type = protein
                        organism = Helicobacter pylori
SEQUENCE: 226
ISKDLKDFSK SFDEF                                                    15

SEQ ID NO: 227          moltype = AA  length = 15
FEATURE                 Location/Qualifiers
source                  1..15
                        mol_type = protein
                        organism = Helicobacter pylori
SEQUENCE: 227
KSFDGFKNGK NKDFS                                                    15

SEQ ID NO: 228          moltype = AA  length = 15
FEATURE                 Location/Qualifiers
source                  1..15
                        mol_type = protein
                        organism = Helicobacter pylori
SEQUENCE: 228
```

```
KIENLNVALN DFKNG                                                     15

SEQ ID NO: 229          moltype = AA  length = 15
FEATURE                 Location/Qualifiers
source                  1..15
                        mol_type = protein
                        organism = Helicobacter pylori SEQUENCE: 229
EWISKIENLN VALND                                                     15

SEQ ID NO: 230          moltype = AA  length = 15
FEATURE                 Location/Qualifiers
source                  1..15
                        mol_type = protein
                        organism = Helicobacter pylori SEQUENCE: 230
EWVSKVENLN AALNE                                                     15

SEQ ID NO: 231          moltype = AA  length = 15
FEATURE                 Location/Qualifiers
source                  1..15
                        mol_type = protein
                        organism = Helicobacter pylori SEQUENCE: 231
EWISKVENLN AALND                                                     15

SEQ ID NO: 232          moltype = AA  length = 15
FEATURE                 Location/Qualifiers
source                  1..15
                        mol_type = protein
                        organism = Helicobacter pylori SEQUENCE: 232
KVENLNAALN EFKNS                                                     15

SEQ ID NO: 233          moltype = AA  length = 15
FEATURE                 Location/Qualifiers
source                  1..15
                        mol_type = protein
                        organism = Helicobacter pylori SEQUENCE: 233
KVENLNAALN EFKSG                                                     15

SEQ ID NO: 234          moltype = AA  length = 15
FEATURE                 Location/Qualifiers
source                  1..15
                        mol_type = protein
                        organism = Helicobacter pylori SEQUENCE: 234
EWISKIENLN AALND                                                     15

SEQ ID NO: 235          moltype = AA  length = 15
FEATURE                 Location/Qualifiers
source                  1..15
                        mol_type = protein
                        organism = Helicobacter pylori SEQUENCE: 235
IINQKITDKV GNLSS                                                     15

SEQ ID NO: 236          moltype = AA  length = 15
FEATURE                 Location/Qualifiers
source                  1..15
                        mol_type = protein
                        organism = Helicobacter pylori SEQUENCE: 236
ITDKVDNLNQ AVLVA                                                     15

SEQ ID NO: 237          moltype = AA  length = 15
FEATURE                 Location/Qualifiers
source                  1..15
                        mol_type = protein
                        organism = Helicobacter pylori SEQUENCE: 237
KVDNLNQAVS EAKAT                                                     15

SEQ ID NO: 238          moltype = AA  length = 15
FEATURE                 Location/Qualifiers
source                  1..15
                        mol_type = protein
                        organism = Helicobacter pylori
```

```
SEQUENCE: 238
KVDNLNQAVS EAKLT                                                                         15

SEQ ID NO: 239         moltype = AA  length = 15
FEATURE                Location/Qualifiers
source                 1..15
                       mol_type = protein
                       organism = Helicobacter pylori
SEQUENCE: 239
VTDKVDNLNQ AVSIA                                                                         15

SEQ ID NO: 240         moltype = AA  length = 15
FEATURE                Location/Qualifiers
source                 1..15
                       mol_type = protein
                       organism = Helicobacter pylori
SEQUENCE: 240
ITDKVDNLNQ AVSMA                                                                         15

SEQ ID NO: 241         moltype = AA  length = 15
FEATURE                Location/Qualifiers
source                 1..15
                       mol_type = protein
                       organism = Helicobacter pylori
SEQUENCE: 241
VTDKVDNLNQ EVSVA                                                                         15

SEQ ID NO: 242         moltype = AA  length = 15
FEATURE                Location/Qualifiers
source                 1..15
                       mol_type = protein
                       organism = Helicobacter pylori
SEQUENCE: 242
VTDKVDNLNQ AVSMA                                                                         15

SEQ ID NO: 243         moltype = AA  length = 15
FEATURE                Location/Qualifiers
source                 1..15
                       mol_type = protein
                       organism = Helicobacter pylori
SEQUENCE: 243
ITDKVDNLNQ AVSET                                                                         15

SEQ ID NO: 244         moltype = AA  length = 15
FEATURE                Location/Qualifiers
source                 1..15
                       mol_type = protein
                       organism = Helicobacter pylori
SEQUENCE: 244
VTDKVDNLNQ AVSVA                                                                         15

SEQ ID NO: 245         moltype = AA  length = 15
FEATURE                Location/Qualifiers
source                 1..15
                       mol_type = protein
                       organism = Helicobacter pylori
SEQUENCE: 245
ITDKVDNLNQ AVSVA                                                                         15

SEQ ID NO: 246         moltype = AA  length = 15
FEATURE                Location/Qualifiers
source                 1..15
                       mol_type = protein
                       organism = Helicobacter pylori
SEQUENCE: 246
KVDNLNQAVS IAKET                                                                         15

SEQ ID NO: 247         moltype = AA  length = 15
FEATURE                Location/Qualifiers
source                 1..15
                       mol_type = protein
                       organism = Helicobacter pylori
SEQUENCE: 247
KVDNLNQAVS VAKIT                                                                         15

SEQ ID NO: 248         moltype = AA  length = 15
FEATURE                Location/Qualifiers
source                 1..15
                       mol_type = protein
```

```
                              organism = Helicobacter pylori
SEQUENCE: 248
ITDKVDDLNQ AVSVA                                                        15

SEQ ID NO: 249          moltype = AA   length = 15
FEATURE                 Location/Qualifiers
source                  1..15
                        mol_type = protein
                        organism = Helicobacter pylori
SEQUENCE: 249
KVDNLNQAVS IAKAT                                                        15

SEQ ID NO: 250          moltype = AA   length = 15
FEATURE                 Location/Qualifiers
source                  1..15
                        mol_type = protein
                        organism = Helicobacter pylori
SEQUENCE: 250
KVDNLSQAVS VAKIA                                                        15

SEQ ID NO: 251          moltype = AA   length = 15
FEATURE                 Location/Qualifiers
source                  1..15
                        mol_type = protein
                        organism = Helicobacter pylori
SEQUENCE: 251
KVDDLNQAVS VAKAT                                                        15

SEQ ID NO: 252          moltype = AA   length = 15
FEATURE                 Location/Qualifiers
source                  1..15
                        mol_type = protein
                        organism = Helicobacter pylori
SEQUENCE: 252
ITDKVDDLNQ AVLVA                                                        15

SEQ ID NO: 253          moltype = AA   length = 15
FEATURE                 Location/Qualifiers
source                  1..15
                        mol_type = protein
                        organism = Helicobacter pylori
SEQUENCE: 253
ITNKVDDLNQ AVSVA                                                        15

SEQ ID NO: 254          moltype = AA   length = 15
FEATURE                 Location/Qualifiers
source                  1..15
                        mol_type = protein
                        organism = Helicobacter pylori
SEQUENCE: 254
KVDNLSSAVS VAKAM                                                        15

SEQ ID NO: 255          moltype = AA   length = 15
FEATURE                 Location/Qualifiers
source                  1..15
                        mol_type = protein
                        organism = Helicobacter pylori
SEQUENCE: 255
VTDKVDDLNQ AVSVA                                                        15

SEQ ID NO: 256          moltype = AA   length = 15
FEATURE                 Location/Qualifiers
source                  1..15
                        mol_type = protein
                        organism = Helicobacter pylori
SEQUENCE: 256
ITDKVDDLNQ AVSMA                                                        15

SEQ ID NO: 257          moltype = AA   length = 15
FEATURE                 Location/Qualifiers
source                  1..15
                        mol_type = protein
                        organism = Helicobacter pylori
SEQUENCE: 257
TLSKNFSDIK KELNA                                                        15

SEQ ID NO: 258          moltype = AA   length = 15
FEATURE                 Location/Qualifiers
source                  1..15
```

```
                    mol_type = protein
                    organism = Helicobacter pylori
SEQUENCE: 258
TLTKKFSDIK KELNE                                        15

SEQ ID NO: 259      moltype = AA  length = 15
FEATURE             Location/Qualifiers
source              1..15
                    mol_type = protein
                    organism = Helicobacter pylori
SEQUENCE: 259
NLTKNFSDIR KELNE                                        15

SEQ ID NO: 260      moltype = AA  length = 15
FEATURE             Location/Qualifiers
source              1..15
                    mol_type = protein
                    organism = Helicobacter pylori
SEQUENCE: 260
TLTKNFSDIR KELNE                                        15

SEQ ID NO: 261      moltype = AA  length = 15
FEATURE             Location/Qualifiers
source              1..15
                    mol_type = protein
                    organism = Helicobacter pylori
SEQUENCE: 261
NEKFKNFNNN NNGLK                                        15

SEQ ID NO: 262      moltype = AA  length = 15
FEATURE             Location/Qualifiers
source              1..15
                    mol_type = protein
                    organism = Helicobacter pylori
SEQUENCE: 262
NSNGLKNSAE PIYAQ                                        15

SEQ ID NO: 263      moltype = AA  length = 15
FEATURE             Location/Qualifiers
source              1..15
                    mol_type = protein
                    organism = Helicobacter pylori
SEQUENCE: 263
NNNGLKNSTE PIYAK                                        15

SEQ ID NO: 264      moltype = AA  length = 15
FEATURE             Location/Qualifiers
source              1..15
                    mol_type = protein
                    organism = Helicobacter pylori
SEQUENCE: 264
TQVAKKVKAK IDRLD                                        15

SEQ ID NO: 265      moltype = AA  length = 15
FEATURE             Location/Qualifiers
source              1..15
                    mol_type = protein
                    organism = Helicobacter pylori
SEQUENCE: 265
TQVAKKVTKK IDQLN                                        15

SEQ ID NO: 266      moltype = AA  length = 15
FEATURE             Location/Qualifiers
source              1..15
                    mol_type = protein
                    organism = Helicobacter pylori
SEQUENCE: 266
RHDKVDDLSK IGRSV                                        15

SEQ ID NO: 267      moltype = AA  length = 15
FEATURE             Location/Qualifiers
source              1..15
                    mol_type = protein
                    organism = Helicobacter pylori
SEQUENCE: 267
RHDKVDDLSK VGLSR                                        15

SEQ ID NO: 268      moltype = AA  length = 15
FEATURE             Location/Qualifiers
```

```
source                   1..15
                         mol_type = protein
                         organism = Helicobacter pylori
SEQUENCE: 268
KHAKVDDLSK VGRSV                                                          15

SEQ ID NO: 269           moltype = AA  length = 15
FEATURE                  Location/Qualifiers
source                   1..15
                         mol_type = protein
                         organism = Helicobacter pylori
SEQUENCE: 269
RHDKVDDLSK VGLSA                                                          15

SEQ ID NO: 270           moltype = AA  length = 15
FEATURE                  Location/Qualifiers
source                   1..15
                         mol_type = protein
                         organism = Helicobacter pylori
SEQUENCE: 270
LKRYAKVDDL SKVGL                                                          15

SEQ ID NO: 271           moltype = AA  length = 15
FEATURE                  Location/Qualifiers
source                   1..15
                         mol_type = protein
                         organism = Helicobacter pylori
SEQUENCE: 271
RHDKVDDLSK VGRSR                                                          15

SEQ ID NO: 272           moltype = AA  length = 15
FEATURE                  Location/Qualifiers
source                   1..15
                         mol_type = protein
                         organism = Helicobacter pylori
SEQUENCE: 272
LKRYAKVDDL SKAGR                                                          15

SEQ ID NO: 273           moltype = AA  length = 15
FEATURE                  Location/Qualifiers
source                   1..15
                         mol_type = protein
                         organism = Helicobacter pylori
SEQUENCE: 273
RYAKVDDLSK VGLSR                                                          15

SEQ ID NO: 274           moltype = AA  length = 15
FEATURE                  Location/Qualifiers
source                   1..15
                         mol_type = protein
                         organism = Helicobacter pylori
SEQUENCE: 274
KVDDLSKVGL SANHE                                                          15

SEQ ID NO: 275           moltype = AA  length = 15
FEATURE                  Location/Qualifiers
source                   1..15
                         mol_type = protein
                         organism = Helicobacter pylori
SEQUENCE: 275
KVDDLSKVGL SREQE                                                          15

SEQ ID NO: 276           moltype = AA  length = 15
FEATURE                  Location/Qualifiers
source                   1..15
                         mol_type = protein
                         organism = Helicobacter pylori
SEQUENCE: 276
KVDDLTKVGF SREQE                                                          15

SEQ ID NO: 277           moltype = AA  length = 15
FEATURE                  Location/Qualifiers
source                   1..15
                         mol_type = protein
                         organism = Helicobacter pylori
SEQUENCE: 277
KVDDLSKVGL SANPE                                                          15

SEQ ID NO: 278           moltype = AA  length = 15
```

```
FEATURE                     Location/Qualifiers
source                      1..15
                            mol_type = protein
                            organism = Helicobacter pylori
SEQUENCE: 278
VGQAGFPFKK HAKVE                                                                15

SEQ ID NO: 279              moltype = AA  length = 15
FEATURE                     Location/Qualifiers
source                      1..15
                            mol_type = protein
                            organism = Helicobacter pylori
SEQUENCE: 279
GSSPLKRYAK VDDLS                                                                15

SEQ ID NO: 280              moltype = AA  length = 15
FEATURE                     Location/Qualifiers
source                      1..15
                            mol_type = protein
                            organism = Helicobacter pylori
SEQUENCE: 280
PEPIYATIDF DDANQ                                                                15

SEQ ID NO: 281              moltype = AA  length = 15
FEATURE                     Location/Qualifiers
source                      1..15
                            mol_type = protein
                            organism = Helicobacter pylori
SEQUENCE: 281
PEPIYATIDF DEANQ                                                                15

SEQ ID NO: 282              moltype = AA  length = 15
FEATURE                     Location/Qualifiers
source                      1..15
                            mol_type = protein
                            organism = Helicobacter pylori
SEQUENCE: 282
AVSEAKAGFF GNLEQ                                                                15

SEQ ID NO: 283              moltype = AA  length = 15
FEATURE                     Location/Qualifiers
source                      1..15
                            mol_type = protein
                            organism = Helicobacter pylori
SEQUENCE: 283
KAGFFGNLEQ TIDKL                                                                15

SEQ ID NO: 284              moltype = AA  length = 15
FEATURE                     Location/Qualifiers
source                      1..15
                            mol_type = protein
                            organism = Helicobacter pylori
SEQUENCE: 284
AVSEAKAGFF GNLER                                                                15

SEQ ID NO: 285              moltype = AA  length = 15
FEATURE                     Location/Qualifiers
source                      1..15
                            mol_type = protein
                            organism = Helicobacter pylori
SEQUENCE: 285
KAGFFGNLEQ TIGNL                                                                15

SEQ ID NO: 286              moltype = AA  length = 15
FEATURE                     Location/Qualifiers
source                      1..15
                            mol_type = protein
                            organism = Helicobacter pylori
SEQUENCE: 286
KVGFFGNLEQ TIDKL                                                                15

SEQ ID NO: 287              moltype = AA  length = 15
FEATURE                     Location/Qualifiers
source                      1..15
                            mol_type = protein
                            organism = Helicobacter pylori
SEQUENCE: 287
AVSEAKVGFF GNLEQ                                                                15
```

```
SEQ ID NO: 288          moltype = AA   length = 15
FEATURE                 Location/Qualifiers
source                  1..15
                        mol_type = protein
                        organism = Helicobacter pylori
SEQUENCE: 288
KAGFFGNLEQ TIDNL                                                         15

SEQ ID NO: 289          moltype = AA   length = 15
FEATURE                 Location/Qualifiers
source                  1..15
                        mol_type = protein
                        organism = Helicobacter pylori
SEQUENCE: 289
KAGFFGNLEQ TINNL                                                         15

SEQ ID NO: 290          moltype = AA   length = 15
FEATURE                 Location/Qualifiers
source                  1..15
                        mol_type = protein
                        organism = Helicobacter pylori
SEQUENCE: 290
KAGYFGNLEQ TIDNL                                                         15

SEQ ID NO: 291          moltype = AA   length = 15
FEATURE                 Location/Qualifiers
source                  1..15
                        mol_type = protein
                        organism = Helicobacter pylori
SEQUENCE: 291
KAGFFGNLER TIDKL                                                         15

SEQ ID NO: 292          moltype = AA   length = 15
FEATURE                 Location/Qualifiers
source                  1..15
                        mol_type = protein
                        organism = Helicobacter pylori
SEQUENCE: 292
AVSEAKSGFF GNLEQ                                                         15

SEQ ID NO: 293          moltype = AA   length = 15
FEATURE                 Location/Qualifiers
source                  1..15
                        mol_type = protein
                        organism = Helicobacter pylori
SEQUENCE: 293
KAGFFGNLEQ TMDRL                                                         15

SEQ ID NO: 294          moltype = AA   length = 15
FEATURE                 Location/Qualifiers
source                  1..15
                        mol_type = protein
                        organism = Helicobacter pylori
SEQUENCE: 294
KAGYFGNLEQ TIDKL                                                         15

SEQ ID NO: 295          moltype = AA   length = 15
FEATURE                 Location/Qualifiers
source                  1..15
                        mol_type = protein
                        organism = Helicobacter pylori
SEQUENCE: 295
KAGFFGNLER TIDNL                                                         15

SEQ ID NO: 296          moltype = AA   length = 15
FEATURE                 Location/Qualifiers
source                  1..15
                        mol_type = protein
                        organism = Helicobacter pylori
SEQUENCE: 296
AVSEAKAGYF GNLEQ                                                         15

SEQ ID NO: 297          moltype = AA   length = 15
FEATURE                 Location/Qualifiers
source                  1..15
                        mol_type = protein
                        organism = Helicobacter pylori
SEQUENCE: 297
KVPDSLSAKL DNYAT                                                         15
```

| | | |
|---|---|---|
| SEQ ID NO: 298<br>FEATURE<br>source | moltype = AA length = 15<br>Location/Qualifiers<br>1..15<br>mol_type = protein<br>organism = Helicobacter pylori | |
| SEQUENCE: 298<br>MNLWAESAKK VPAGL | | 15 |
| SEQ ID NO: 299<br>FEATURE<br>source | moltype = AA length = 15<br>Location/Qualifiers<br>1..15<br>mol_type = protein<br>organism = Helicobacter pylori | |
| SEQUENCE: 299<br>VNLWAESAKK VPVSL | | 15 |
| SEQ ID NO: 300<br>FEATURE<br>source | moltype = AA length = 15<br>Location/Qualifiers<br>1..15<br>mol_type = protein<br>organism = Helicobacter pylori | |
| SEQUENCE: 300<br>KVPASLLEKL DNYAT | | 15 |
| SEQ ID NO: 301<br>FEATURE<br>source | moltype = AA length = 15<br>Location/Qualifiers<br>1..15<br>mol_type = protein<br>organism = Helicobacter pylori | |
| SEQUENCE: 301<br>MNLWAESAKK VPASL | | 15 |
| SEQ ID NO: 302<br>FEATURE<br>source | moltype = AA length = 15<br>Location/Qualifiers<br>1..15<br>mol_type = protein<br>organism = Helicobacter pylori | |
| SEQUENCE: 302<br>VNLWAENAKK LPASL | | 15 |
| SEQ ID NO: 303<br>FEATURE<br>source | moltype = AA length = 15<br>Location/Qualifiers<br>1..15<br>mol_type = protein<br>organism = Helicobacter pylori | |
| SEQUENCE: 303<br>VESAKQVPAG LQAKL | | 15 |
| SEQ ID NO: 304<br>FEATURE<br>source | moltype = AA length = 15<br>Location/Qualifiers<br>1..15<br>mol_type = protein<br>organism = Helicobacter pylori | |
| SEQUENCE: 304<br>NGGINEKATG MLTQK | | 15 |
| SEQ ID NO: 305<br>FEATURE<br>source | moltype = AA length = 15<br>Location/Qualifiers<br>1..15<br>mol_type = protein<br>organism = Helicobacter pylori | |
| SEQUENCE: 305<br>EKAIGMLTQK NPEWL | | 15 |
| SEQ ID NO: 306<br>FEATURE<br>source | moltype = AA length = 15<br>Location/Qualifiers<br>1..15<br>mol_type = protein<br>organism = Helicobacter pylori | |
| SEQUENCE: 306<br>EKATGVLTQK NPEWL | | 15 |
| SEQ ID NO: 307<br>FEATURE<br>source | moltype = AA length = 15<br>Location/Qualifiers<br>1..15<br>mol_type = protein<br>organism = Helicobacter pylori | |
| SEQUENCE: 307 | | |

```
EKATGMLMQK NPEWL                                                          15

SEQ ID NO: 308          moltype = AA   length = 15
FEATURE                 Location/Qualifiers
source                  1..15
                        mol_type = protein
                        organism = Helicobacter pylori SEQUENCE: 308
KDYSDSFKFS TKLNS                                                          15

SEQ ID NO: 309          moltype = AA   length = 15
FEATURE                 Location/Qualifiers
source                  1..15
                        mol_type = protein
                        organism = Helicobacter pylori SEQUENCE: 309
GSVPLSAYDK IGFNQ                                                          15

SEQ ID NO: 310          moltype = AA   length = 15
FEATURE                 Location/Qualifiers
source                  1..15
                        mol_type = protein
                        organism = Helicobacter pylori SEQUENCE: 310
GSVSLSEYDK IGFNQ                                                          15

SEQ ID NO: 311          moltype = AA   length = 15
FEATURE                 Location/Qualifiers
source                  1..15
                        mol_type = protein
                        organism = Helicobacter pylori SEQUENCE: 311
GSTHLSEYDK IGFNQ                                                          15

SEQ ID NO: 312          moltype = AA   length = 15
FEATURE                 Location/Qualifiers
source                  1..15
                        mol_type = protein
                        organism = Helicobacter pylori SEQUENCE: 312
LSEYDNIGFS QKNMK                                                          15

SEQ ID NO: 313          moltype = AA   length = 15
FEATURE                 Location/Qualifiers
source                  1..15
                        mol_type = protein
                        organism = Helicobacter pylori SEQUENCE: 313
GSAHLSEYDK IGFNQ                                                          15

SEQ ID NO: 314          moltype = AA   length = 15
FEATURE                 Location/Qualifiers
source                  1..15
                        mol_type = protein
                        organism = Helicobacter pylori SEQUENCE: 314
GSAPLSDYDK IGFNQ                                                          15

SEQ ID NO: 315          moltype = AA   length = 15
FEATURE                 Location/Qualifiers
source                  1..15
                        mol_type = protein
                        organism = Helicobacter pylori SEQUENCE: 315
DSFKFSTKLN SAIKD                                                          15

SEQ ID NO: 316          moltype = AA   length = 15
FEATURE                 Location/Qualifiers
source                  1..15
                        mol_type = protein
                        organism = Helicobacter pylori SEQUENCE: 316
GSVPLSEYDK IGFNQ                                                          15

SEQ ID NO: 317          moltype = AA   length = 15
FEATURE                 Location/Qualifiers
source                  1..15
                        mol_type = protein
                        organism = Helicobacter pylori
```

```
SEQUENCE: 317
GSAPLSEYDN IGFSQ                                                    15

SEQ ID NO: 318          moltype = AA  length = 15
FEATURE                 Location/Qualifiers
source                  1..15
                        mol_type = protein
                        organism = Helicobacter pylori
SEQUENCE: 318
GSAPLSEYDK IGFNQ                                                    15

SEQ ID NO: 319          moltype = AA  length = 15
FEATURE                 Location/Qualifiers
source                  1..15
                        mol_type = protein
                        organism = Helicobacter pylori
SEQUENCE: 319
GSAPLSAYDK IGFNQ                                                    15

SEQ ID NO: 320          moltype = AA  length = 15
FEATURE                 Location/Qualifiers
source                  1..15
                        mol_type = protein
                        organism = Helicobacter pylori
SEQUENCE: 320
DSFKFSTKLN DAVKD                                                    15

SEQ ID NO: 321          moltype = AA  length = 15
FEATURE                 Location/Qualifiers
source                  1..15
                        mol_type = protein
                        organism = Helicobacter pylori
SEQUENCE: 321
DSFKFSTKLN NAVKN                                                    15

SEQ ID NO: 322          moltype = AA  length = 15
FEATURE                 Location/Qualifiers
source                  1..15
                        mol_type = protein
                        organism = Helicobacter pylori
SEQUENCE: 322
GSVPLSEYDN IGFNQ                                                    15

SEQ ID NO: 323          moltype = AA  length = 15
FEATURE                 Location/Qualifiers
source                  1..15
                        mol_type = protein
                        organism = Helicobacter pylori
SEQUENCE: 323
DSFKFSTKLN NAVKD                                                    15

SEQ ID NO: 324          moltype = AA  length = 15
FEATURE                 Location/Qualifiers
source                  1..15
                        mol_type = protein
                        organism = Helicobacter pylori
SEQUENCE: 324
DSFKFSTKLS NAVKN                                                    15

SEQ ID NO: 325          moltype = AA  length = 15
FEATURE                 Location/Qualifiers
source                  1..15
                        mol_type = protein
                        organism = Helicobacter pylori
SEQUENCE: 325
DSFKFSTRLN NAVKD                                                    15

SEQ ID NO: 326          moltype = AA  length = 15
FEATURE                 Location/Qualifiers
source                  1..15
                        mol_type = protein
                        organism = Helicobacter pylori
SEQUENCE: 326
GSTPLSDYDK IGFNQ                                                    15

SEQ ID NO: 327          moltype = AA  length = 15
FEATURE                 Location/Qualifiers
source                  1..15
                        mol_type = protein
```

-continued

```
                         organism = Helicobacter pylori
SEQUENCE: 327
DSFKFSTELN NAVKD                                                        15

SEQ ID NO: 328          moltype = AA  length = 15
FEATURE                 Location/Qualifiers
source                  1..15
                        mol_type = protein
                        organism = Helicobacter pylori
SEQUENCE: 328
GSTPLSEYDK IGFNQ                                                        15

SEQ ID NO: 329          moltype = AA  length = 15
FEATURE                 Location/Qualifiers
source                  1..15
                        mol_type = protein
                        organism = Helicobacter pylori
SEQUENCE: 329
DSFKFSTKLS NAVKD                                                        15

SEQ ID NO: 330          moltype = AA  length = 15
FEATURE                 Location/Qualifiers
source                  1..15
                        mol_type = protein
                        organism = Helicobacter pylori
SEQUENCE: 330
DSFKFSTKSN NAVKD                                                        15

SEQ ID NO: 331          moltype =     length =
SEQUENCE: 331
000

SEQ ID NO: 332          moltype = AA  length = 5
FEATURE                 Location/Qualifiers
source                  1..5
                        mol_type = protein
                        organism = Helicobacter pylori
SEQUENCE: 332
EPIYA                                                                    5
```

The invention claimed is:

1. A method of diagnosis comprising the steps of:
   a) providing a sample from a subject having, or suspected of having, a *Helicobacter pylori* infection and/or increased risk of gastric cancer in the subject,
   b) contacting said sample with a peptide comprising an amino acid sequence selected from the group consisting of: SEQ ID NO: 26, SEQ ID NO: 171, SEQ ID NO: 172, SEQ ID NO: 173, SEQ ID NO: 174, SEQ ID NO: 175, SEQ ID NO: 176, SEQ ID NO: 177, SEQ ID NO: 178, SEQ ID NO: 179, SEQ ID NO: 180, SEQ ID NO: 181, SEQ ID NO: 182, SEQ ID NO: 183, SEQ ID NO: 184, SEQ ID NO: 185, SEQ ID NO: 280, and SEQ ID NO: 281, said peptide consisting of at most 25 amino acids, and
   c) detecting specific binding of antibodies in the sample to the peptide, wherein presence of antibodies in the sample which specifically bind to the peptide is indicative of *Helicobacter pylori* infection and/or increased risk of gastric cancer in the subject.

2. The method of claim 1, wherein the peptide consists of at most 15 amino acids.

3. A method for prevention of gastric cancer comprising using the diagnosis method of claim 1 to determine that the subject has a *Helicobacter pylori* infection, and then administering a treatment for the *Helicobacter pylori* infection to the subject.

4. The method of claim 3, where the treatment comprises administering at least two antibiotics selected from the group consisting of macrolides, beta-lactams, nitroimidazoles, tetracyclines and fluoroquinolones.

5. The method of claim 3, where the treatment comprises administration of a proton pump inhibitor to the subject.

6. A method of detecting *H. pylori* CagA-binding antibodies in a sample from a subject, the method comprising contacting a biological sample with a peptide comprising an amino acid sequence selected from the group consisting of: SEQ ID NO: 26, SEQ ID NO: 171, SEQ ID NO: 172, SEQ ID NO: 173, SEQ ID NO: 174, SEQ ID NO: 175, SEQ ID NO: 176, SEQ ID NO: 177, SEQ ID NO: 178, SEQ ID NO: 179, SEQ ID NO: 180, SEQ ID NO: 181, SEQ ID NO: 182, SEQ ID NO: 183, SEQ ID NO: 184, SEQ ID NO: 185, SEQ ID NO: 280, and SEQ ID NO: 281, said peptide consisting of at most 25 amino acids and detecting binding of antibodies in the sample to the peptide.

7. The method of claim 6, wherein the sample is a blood, serum, plasma or gastric tissue sample.

8. The method of claim 6, wherein the peptide consists of at most 15 amino acids.

* * * * *